United States Patent
Kubota et al.

(10) Patent No.: US 9,132,694 B2
(45) Date of Patent: Sep. 15, 2015

(54) TIRE/WHEEL ASSEMBLY

(71) Applicant: The Yokohama Rubber Co., LTD., Sandy, UT (US)

(72) Inventors: Masataka Kubota, Hiratsuka (JP); Masatoshi Kuwajima, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 427 days.

(21) Appl. No.: 13/629,314

(22) Filed: Sep. 27, 2012

(65) Prior Publication Data

US 2013/0076108 A1 Mar. 28, 2013

(30) Foreign Application Priority Data

Sep. 28, 2011 (JP) ................. 2011-213096

(51) Int. Cl.
| | |
|---|---|
| B60B 19/10 | (2006.01) |
| B60B 3/00 | (2006.01) |
| B60C 13/02 | (2006.01) |
| B60B 7/00 | (2006.01) |
| B60B 1/06 | (2006.01) |
| B60C 3/06 | (2006.01) |

(52) U.S. Cl.
CPC . *B60B 3/002* (2013.01); *B60B 1/06* (2013.01); *B60B 7/0066* (2013.01); *B60B 7/0086* (2013.01); *B60C 13/02* (2013.01); *B60B 7/0073* (2013.01); *B60C 3/06* (2013.01)

(58) Field of Classification Search
CPC ........ B60B 19/10; B60B 7/00; B60B 7/0026; B60B 7/0066; B60B 7/008; B60B 7/0086; B60B 3/002; B60B 3/007; B60C 13/02

USPC ............ 301/6.3, 37.101; 152/523; 296/180.1
See application file for complete search history.

(56) References Cited

U.S. PATENT DOCUMENTS

| | | | | | |
|---|---|---|---|---|---|
| 1,420,097 | A | * | 6/1922 | Harvey | 301/63.108 |
| 1,447,927 | A | * | 3/1923 | Crawford | 301/63.108 |
| 2,017,076 | A | * | 10/1935 | Sauzedde | 301/6.2 |
| 2,828,838 | A | * | 4/1958 | Lyon | 188/264 W |
| 2,992,708 | A | * | 7/1961 | Lyon | 188/264 W |
| 3,153,557 | A | * | 10/1964 | O'Brien | 301/6.3 |
| 3,732,951 | A | * | 5/1973 | Hata et al. | 188/24.13 |
| 4,284,302 | A | * | 8/1981 | Drews | 296/181.5 |
| 5,551,761 | A | * | 9/1996 | White | 301/6.3 |
| 5,820,203 | A | * | 10/1998 | Morelli et al. | 296/180.1 |
| 7,114,785 | B2 | * | 10/2006 | Ording et al. | 301/63.106 |
| 8,297,711 | B2 | * | 10/2012 | Koshiyama et al. | 301/95.104 |

FOREIGN PATENT DOCUMENTS

| | | |
|---|---|---|
| JP | S60-060301 | 4/1985 |
| JP | 2006-082733 | 3/2006 |
| JP | 2007-137340 | 6/2007 |
| JP | 2010-006135 | 1/2010 |
| JP | 2010-209797 | 9/2010 |
| JP | 2010-260376 | 11/2010 |
| JP | 2010-260378 | 11/2010 |
| JP | H10-058925 | 11/2010 |
| JP | 2010-274809 | 12/2010 |
| JP | 2011-037372 | 2/2011 |

* cited by examiner

*Primary Examiner* — Jason Bellinger
(74) *Attorney, Agent, or Firm* — Thorpe North & Western

(57) ABSTRACT

A tire/wheel assembly includes a wheel having an attaching portion for attaching the wheel to a vehicle and a pneumatic tire that is fit on a periphery of the wheel. The pneumatic tire includes a plurality of tire protrusions and/or a plurality of tire recesses of a tire side portion that constitutes a vehicle outer side, and the wheel includes a plurality of wheel recesses in a surface that constitutes the vehicle outer side.

19 Claims, 22 Drawing Sheets

TIRE/WHEEL ASSEMBLY

PRIORITY CLAIM

Priority is claimed to Japan Patent Application Serial No. 2011-213096 filed on Sep. 28, 2011.

BACKGROUND

1. Technical Field

The present technology relates to a tire/wheel assembly and particularly relates to a tire/wheel assembly by which air flow around the tire and the wheel can be improved.

2. Related Art

Tire/wheel assemblies are formed by assembling a pneumatic tire on a wheel that is joined to a vehicle. For example, Japanese Unexamined Patent Application Publication No. 2006-82733A describes vehicle-use tire and a wheel on which the vehicle-use tire is mounted where a face substantially parallel to a face perpendicular to a rotational axis is provided from a side wall portion to a bead portion on at least a vehicle outer side of tire side surfaces on both sides.

Additionally, Japanese Unexamined Patent Application Publication No. 2010-006135A describes a vehicle-use wheel constituted by fitting a wheel disk in a wheel rim, the wheel disk including a concentrically formed hub mounting portion formed from an inner side round region that joins with a hub of an axle, a design portion formed from an annular region outward of the hub mounting portion, and an annular protrusion portion protruding toward a front surface side between the hub mounting portion and the design portion. In the wheel disk, an annular protrusion portion that protrudes toward the front surface side is omitted from the protrusion portion; a plurality of dimple-shaped bowl-like curved portions, which are recessed in a bowl-shape at the front surface side and protrude from a back surface side, is disposed in a staggered lattice manner in the design portion. Japanese Unexamined Patent Application Publication No. 2007-137340A describes a vehicle-use wheel including a cylindrical rim and a spoke extending from an inner circumferential surface to a central portion of the rim. In this vehicle-use wheel, a small turbulence generating means is formed in the inner circumferential surface of the rim and/or an outer side portion of the spoke.

Traveling performance of a vehicle needs to be enhanced. Thus, various performances of tire/wheel assemblies also need to be enhanced, including fuel economy performance of tire/wheel assemblies.

SUMMARY

The present technology provides a tire/wheel assembly by which traveling performances can be further enhanced. A tire/wheel assembly of the present technology includes a wheel including an attaching portion for attaching the wheel to a vehicle, and a pneumatic tire that is fit on a periphery of the wheel. The pneumatic tire includes a plurality of tire protrusions and/or a plurality of tire recesses of a tire side portion that constitutes a vehicle outer side, and the wheel includes a plurality of wheel recesses in a surface that constitutes the vehicle outer side.

According to the configuration described above, the tire/wheel assembly can generate a suitable turbulent flow on the surface of the vehicle outer side (the surface of the vehicle outer side of the pneumatic tire and the wheel). Aerodynamic performance can be enhanced dramatically over cases where the area was simply increased where the protrusions and the recesses are provided.

Here, the wheel preferably includes the attaching portion for attaching the wheel to the vehicle; and a wheel disk, wherein a surface of the wheel disk that is fixed to the attaching portion and is exposed to the surface of the vehicle outer side is disk-shaped, and forms a surface constituting the vehicle outer side; and the wheel recesses are preferably formed in the wheel disk. Air flowing from the surface of the vehicle outer side to an inner side of the assembly can be suppressed and aerodynamic performance can be further enhanced by providing the wheel disk.

Additionally, where D is a distance from an outer side edge in a tire radial direction of a rim portion, to which the pneumatic tire is fixed, to a tire rotational axis, the wheel preferably does not include a cavity communicating with an edge surface of a vehicle inner side in a range from a position 0.4D outward in the radial direction from a center in the tire radial direction of the wheel to the outer side edge in the tire radial direction. Thereby, aerodynamic performance can be enhanced.

Additionally, in the wheel, a distance in a tire width direction from a center in a width direction of the tire to an edge surface of the vehicle outer side preferably increases with progression from an outer side in the tire radial direction toward an inner side in the tire radial direction. Thereby, aerodynamic performance can be enhanced.

Additionally, the tire protrusions are disposed in a partial angular range in a tire circumferential direction and the wheel recesses are preferably disposed at least in an entirety of the angular range where the tire protrusions are not formed. Thereby, the turbulent flow can be suitably generated and the aerodynamic performance can be enhanced.

Additionally, the wheel recesses preferably constitute a plurality of wheel recess rows formed in rows in the tire radial direction, and the wheel recess rows are disposed at a pitch in the tire circumferential direction. Thereby, the turbulent flow can be suitably generated and the aerodynamic performance can be enhanced.

Additionally, the wheel recess rows are preferably disposed at a position where a center line overlaps with an extended line of a center line of the tire protrusions extended outward in the radial direction.

Additionally, the wheel recess rows preferably vary according to a rule in which an area of an opening of the wheel recesses at the surface of the vehicle outer side decreases with progression from the outer side in the tire radial direction toward the inner side in the tire radial direction and/or a rule in which a depth of the wheel recesses from the surface of the vehicle outer side decreases with progression from the outer side in the tire radial direction toward the inner side in the tire radial direction. Thereby, the turbulent flow can be suitably generated and the aerodynamic performance can be enhanced.

Additionally, the tire recesses preferably constitute a plurality of tire recess rows formed in rows in the tire radial direction, and the tire recess rows are disposed at a pitch in the tire circumferential direction. Thereby, the turbulent flow can be suitably generated and the aerodynamic performance can be enhanced.

Additionally, the tire recess rows preferably vary according to a rule in which an area of an opening of the tire recesses at the surface of the vehicle outer side decreases with progression from the outer side in the tire radial direction toward the inner side in the tire radial direction and/or a rule in which a depth of the tire recesses from the surface of the vehicle outer side decreases with progression from the outer side in the tire radial direction toward the inner side in the tire radial direction. Thereby, the turbulent flow can be suitably generated and the aerodynamic performance can be enhanced.

Additionally, preferably at least a portion of the tire protrusions and the tire recesses are disposed at a position separated at least 10% or more of a tire cross-sectional height from a position where a tire cross-sectional width of the pneumatic tire is greatest toward the outer side in the tire radial direction. Thereby, overall air resistance can be effectively reduced.

Additionally, preferably at least a portion of the tire protrusions are disposed at a position separated at least 10% or more of the tire cross-sectional height from the position where the tire cross-sectional width of the pneumatic tire is greatest toward the outer side in the tire radial direction; and at least a portion of the tire recesses are disposed in a region from a rim check line to a position separated 10% of the tire cross-sectional height starting from the rim check line toward the outer side in the tire radial direction. Thereby, overall air resistance can be effectively reduced.

Additionally, where $D_1$ is a distance in the tire radial direction from an outer side edge in the tire radial direction of the rim portion, to which the pneumatic tire is fixed, to the tire rotational axis, preferably at least a portion of the wheel recesses are disposed in a region from the outer side edge in the tire radial direction of the rim portion to a position displaced $0.1D_1$ inward in the tire radial direction starting from the outer side edge. Thereby, overall air resistance can be effectively reduced.

Additionally, where $L_1$ is a distance in the tire width direction from a tire equatorial plane of the pneumatic tire to an edge of the vehicle outer side of the pneumatic tire, and $L_2$ is a distance in the tire width direction from the tire equatorial plane of the pneumatic tire to the edge of the vehicle outer side of the wheel, the distance $L_1$ and the distance $L_2$ preferably have a relationship such that $L_2 \leq 1.2 \times L_1$ is satisfied. Thereby, overall air resistance can be effectively reduced.

Additionally, the wheel recesses are preferably configured so that a depth of the wheel recesses from the surface of the vehicle outer side is not less than 0.5 mm and not more than 5.0 mm. Thereby, the turbulent flow can be suitably generated and the aerodynamic performance can be enhanced.

Additionally, the wheel recesses are preferably configured so that a maximum diameter of the wheel recesses in the surface of the vehicle outer side is not less than 1.0 mm and not more than 8.0 mm. Thereby, the turbulent flow can be suitably generated and the aerodynamic performance can be enhanced.

Additionally, a depth of the tire recesses from the surface of the tire side portion is preferably not less than 0.5 mm and not more than 5.0 mm. Thereby, the turbulent flow can be suitably generated and the aerodynamic performance can be enhanced.

Additionally, a maximum diameter of the tire recesses in the surface of the tire side portion is preferably not less than 1.0 mm and not more than 8.0 mm. Thereby, the turbulent flow can be suitably generated and the aerodynamic performance can be enhanced.

Additionally, a height of the tire protrusions protruding from the surface exposed to the surface of the vehicle outer side is preferably not less than 0.5 mm and not more than 10 mm. Thereby, the turbulent flow can be suitably generated and the aerodynamic performance can be enhanced.

Additionally, the tire protrusions are preferably formed with a longitudinal shape in the tire radial direction and are preferably disposed at a pitch in the tire circumferential direction. Thereby, the turbulent flow can be suitably generated and the aerodynamic performance can be enhanced.

With the tire/wheel assembly according to the present technology, air resistance with respect to the air flow flowing on the side surface of the tire/wheel assembly when traveling can be reduced, traveling performances can be further enhanced, and fuel economy can be enhanced.

DETAILED DESCRIPTION

An embodiment of the present technology is described below in detail based on the drawings. However, the present technology is not limited to this embodiment. The constituents of the embodiment include constituents that can be easily replaced by those skilled in the art and constituents substantially same as the constituents of the embodiment. Furthermore, a plurality of modified examples that are described in the embodiment can be freely combined within a scope of obviousness for a person skilled in the art.

Figure 1:
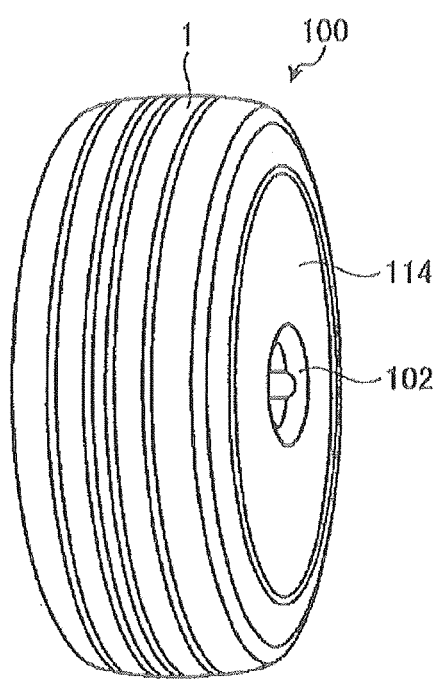
FIG. 1 is a perspective view illustrating a tire/wheel assembly according to an embodiment.
Figure 2:
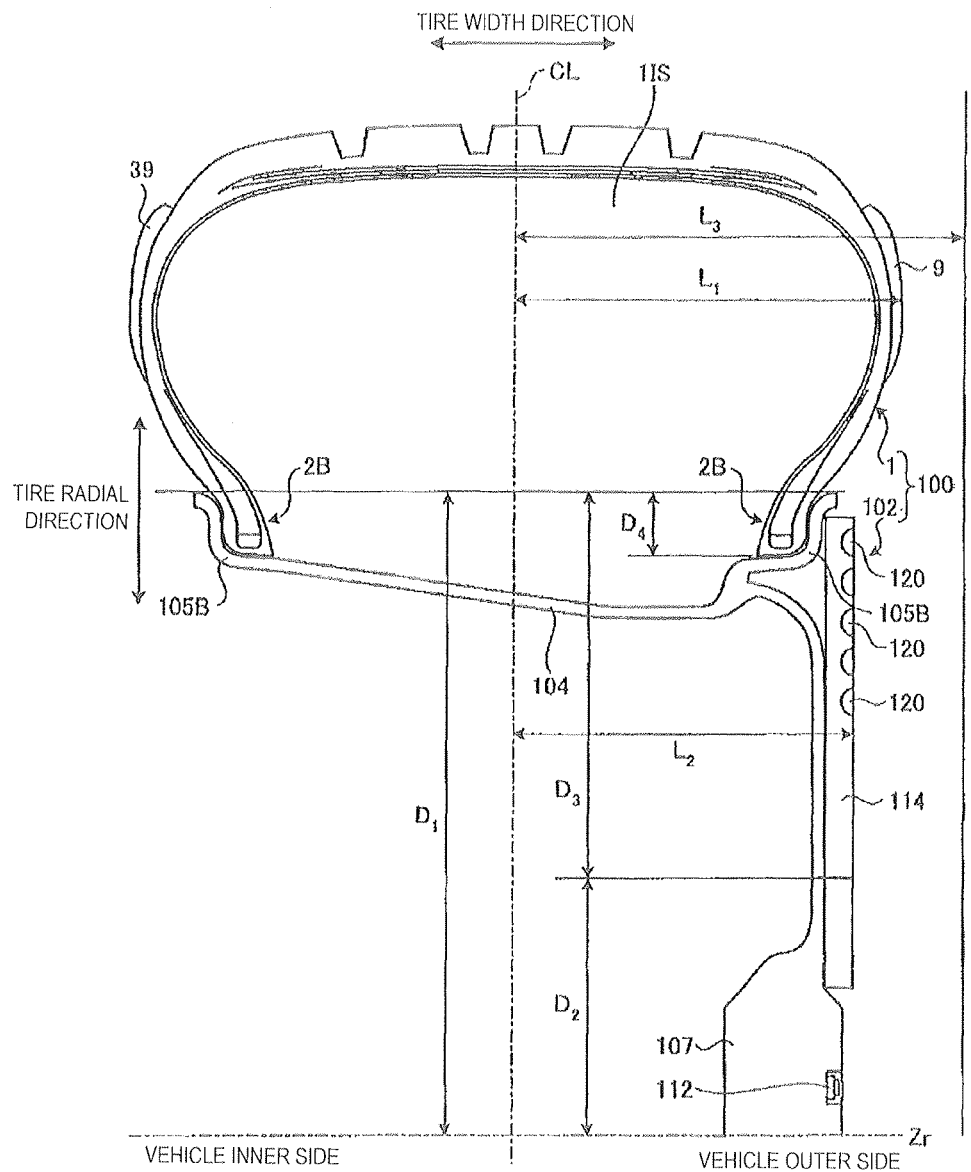
FIG. 2 is a meridian cross-sectional view of the tire/wheel assembly depicted in FIG. 1.
Figure 3:
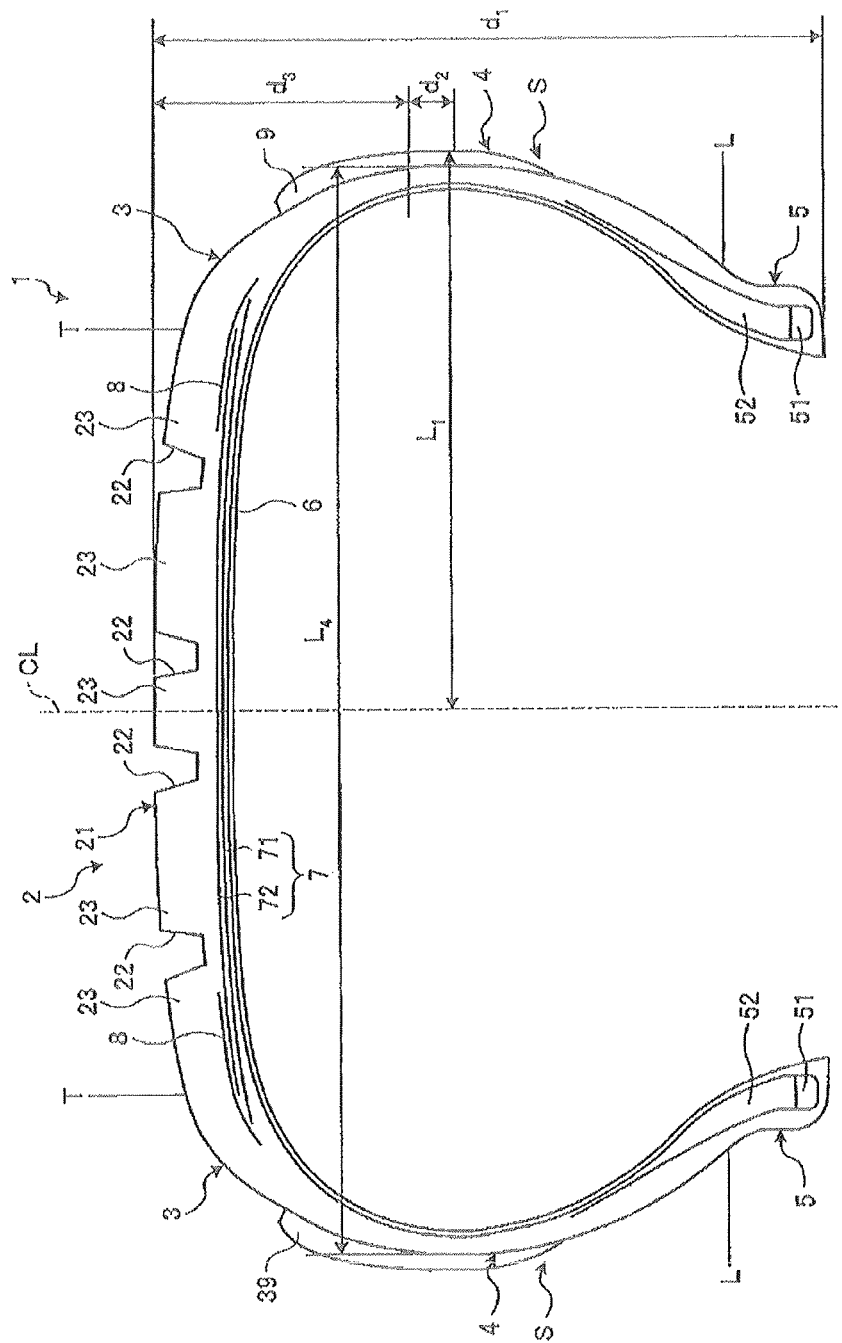
FIG. 3 is a meridian cross-sectional view of the pneumatic tire depicted in FIG. 1.
Figure 4:
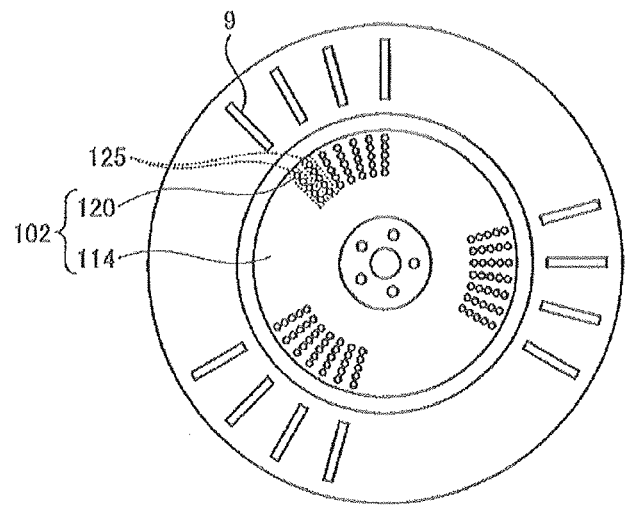
FIG. 4 is a partial appearance view of the tire/wheel assembly according to the embodiment, seen from a vehicle outer side.

FIG. 1 is a perspective view illustrating a tire/wheel assembly according to an embodiment. FIG. 2 is a meridian cross-sectional view of the tire/wheel assembly depicted in FIG. 1. FIG. 3 is a meridian cross-sectional view of the pneumatic tire depicted in FIG. 1. FIG. 4 is a partial appearance view of the tire/wheel assembly according to the embodiment, seen from a vehicle outer side. In the following description, "tire radial direction" refers to a direction orthogonal to the rotational axis (not shown) of the pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between constituents located to the outside in the tire width direction, or in other words, the distance between the constituents that are most distant in the tire width direction from the tire equatorial plane CL. "Tire equator line" refers to a line along the tire circumferential direction of the pneumatic tire 1 that lies on the tire equatorial plane CL. In this embodiment, "tire equator line" is given the same "CL" reference symbol as that used for the tire equatorial plane.

As illustrated in FIGS. 1 and 2, a tire/wheel assembly 100 includes a pneumatic tire 1 and a wheel 102. The pneumatic tire 1 (hereinafter also referred to as "tire") is what is known as a pneumatic tire. Gas injected into the tire 1 is not limited to air.

As illustrated in FIGS. 1 to 3, the pneumatic tire 1 of an embodiment includes a tread portion 2, shoulder portions 3 on both sides of the tread portion 2, and a side wall portion 4 and a bead portion 5 continuing sequentially from each of the shoulder portions 3. Additionally, the pneumatic tire 1 includes a carcass layer 6, a belt layer 7, and a belt reinforcing layer 8. When in use, each of the bead portions 5 of the pneumatic tire 1 are mated with a rim portion 104 of the wheel 102. Moreover, a gas (e.g., air or nitrogen) is injected into a tire internal space 1IS that is surrounded by the pneumatic tire 1 and the wheel 102 (specifically by the rim portion 104 of the wheel 102).

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed on a peripheral surface of the tread portion 2 or, rather, on a road contact surface that contacts a road surface when traveling. The tread surface 21 extends along the tire circumferential direction, and a plurality (four in this embodiment) of main grooves 22 that are straight main grooves parallel with the tire equator line CL are provided in the tread surface 21. Moreover, a plurality of rib-like land portions 23 extending along the lire circumferential direction and parallel with the tire equator line CL, is formed in the tread surface 21 by the plurality of main grooves 22. Additionally, while not explicitly illustrated in the drawings, lug grooves that intersect with the main grooves 22 in each of the land portions 23 are provided in the tread surface 21. The land portions 23 are plurally divided in the tire circumferential direction by the lug grooves. Additionally, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are locations on both outer sides in the tire width direction of the tread portion 2. Additionally, the side wall portions 4 are exposed at an outermost side in the tire width direction of the pneumatic tire 1. The bead portions 5 include a bead core 51 and a bead filler 52. The bead core 51 is formed by winding a steel wire (bead wire) in a ring-like manner. The bead filler 52 is a rubber material that is disposed in space formed by ends of the carcass layer 6 in the tire width direction being folded up at a position of the bead core 51.

The ends of the carcass layer 6 in the tire width direction are folded over the pair of bead cores 51 from the inner side in the tire width direction to the outer side in the tire width direction, and the carcass layer 6 is stretched in a toroidal shape in the tire circumferential direction to form the framework of the tire. The carcass layer 6 is constituted by a plurality of carcass cords (not illustrated) juxtaposed in the tire circumferential direction along the tire meridian direction having a given angle with respect to the tire circumferential direction (e.g. from 85 degrees to 95 degrees), and covered by a coating rubber. The carcass cords are formed from organic fibers (e.g. polyester, rayon, nylon, or the like). At least one layer of this carcass layer 6 is provided.

The belt layer 7 has a multi-layer structure where at least two layers (belts 71 and 72) are stacked. The belt layer 7 is disposed on an outer side in the tire radial direction that is the periphery of the carcass layer 6, in the tread portion 2, and covers the carcass layer 6 in the tire circumferential direction. The belts 71 and 72 are constituted by a plurality of cords (not illustrated) juxtaposed at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually cross.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated), juxtaposed in the tire width direction and substantially parallel (±5 degrees) to the tire circumferential direction, which is covered by a coating rubber. The cords are formed from steel or organic fibers (e.g. polyester, rayon, nylon, or the like). The belt reinforcing layer 8 illustrated in FIG. 3 is disposed so as to cover end portions in the tire width direction of the belt layer 7. The configuration of the belt reinforcing layer 8 is not limited to that described above. While not explicitly illustrated in the drawings, a configuration may be used where the belt reinforcing layer 8 is disposed so as to cover an entirety of the belt layer 7. Alternatively, for example, a configuration may be used where the belt reinforcing layer 8 has two reinforcing layers, where the belt reinforcing layer 8 is formal so that the reinforcing layer on the inner side in the tire radial direction is longer in the tire width direction than the belt layer 7 and disposed so as to cover the entirety of the belt layer 7, and the reinforcing layer on the outer side in the tire radial direction is disposed so as only to cover the end portions in the tire width direction of the belt layer 7. Alternatively, for example, a configuration may be used where the belt reinforcing layer 8 has two reinforcing layers, where each of the reinforcing layers is disposed so as only to cover the end portions in the tire width direction of the belt layer 7. In other words, the belt reinforcing layer 8 overlaps with at least the end portions in the tire width direction of the belt layer 7. Additionally, the belt reinforcing layer 8 is provided by winding band-like (e.g. with a width of 10 mm) strip material in the tire circumferential direction.

In cases where the pneumatic tire 1 of this embodiment is mounted on a vehicle (not illustrated), orientations with respect to the inner side and the outer side in the tire width direction of the vehicle are designated. The orientation designations, while not explicitly illustrated in the drawings, for example, can be shown via indicators provided on the side wall portions 4. Hereinafter, a side facing the inner side of the vehicle when mounted on the vehicle is referred to as a "vehicle inner side" and a side facing the outer side of the vehicle is referred to as a "vehicle outer side". Note that the designations of the vehicle inner side and the vehicle outer side are not limited to cases when mounted on the vehicle. For example, in cases when assembled on a rim, orientation of the rim with respect to the inner side and the outer side of the vehicle in the tire width direction is set. Therefore, in cases when the pneumatic tire 1 is assembled on a rim, the orientation with respect to the inner side (vehicle inner side) and the outer side (vehicle outer side) of the vehicle in the tire width direction is designated.

Additionally, as illustrated in FIG. 3, a plurality of protrusions 9, protruding from the surface of the tire side portion S toward the outer side of the tire, is provided in the tire side portion S of the vehicle outer side. Here, the "tire side portion S" refers to, in FIG. 3, the outer side in the tire width direction from a ground contact edge T of the tread portion 2 or, in other words, a surface that uniformly continues in a range of the outer side in the tire radial direction from a rim check line L. Additionally, the "ground contact edge T" refers to both outermost edges in the tire width direction of a region in which the tread surface 21 of the tread portion 2 of the pneumatic tire 1 contacts the road surface when the pneumatic tire 1 is assembled on a regular rim and filled with regular inner pressure and 70% of a regular load is applied, and the ground contact edge T continues in the tire circumferential direction. Moreover, the "rim check line L" refers to a line used to confirm whether the tire has been assembled on the rim correctly and, typically, is an annular convex line closer to the outer side in the tire radial direction than a rim flange and continues in the tire circumferential direction along a portion adjacent to the rim flange on a front side surface of the bead portions 5.

Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

The tire protrusions 9 are, for example, as illustrated in FIGS. 3 and 4, formed as protrusions that are formed from a rubber material (may be the rubber material forming the tire side portion S or a rubber material different from said rubber material) formed with a longitudinal shape in the tire radial direction in a range of the tire side portion S, and are, as illustrated in FIG. 4, disposed in the tire circumferential direction at a predetermined pitch.

Additionally, as illustrated in FIG. 3, a plurality of protrusions 39, protruding from the surface of the tire side portion S toward the outer side of the tire, is provided on the tire side portion S of the vehicle inner side. The tire protrusions 39 are formed as protrusions that are formed from a rubber material (may be the rubber material forming the tire side portion S or a rubber material different from said rubber material) formed with a longitudinal shape in the tire radial direction in a range of the tire side portion S, and are disposed in the tire circumferential direction at a predetermined pitch. Configurations and forms of the tire protrusions 9 and the tire protrusions 39 are fundamentally the same and only differ in terms of disposal positions on the vehicle outer side and the vehicle inner side, respectively.

Next, the wheel 102 will be described. The tire 1 is attached to the wheel 102. The wheel 102 includes the rim portion 104, a spoke 106, a hub 107, a wheel disk 114, and wheel recesses 120. The rim portion 104 is a cylindrical structure. The rim portion 104 includes tire mating members 105B,105B, on both sides in a direction parallel (width direction) to a center axis (Zr-axis), which mate with each of the bead portions 2B,2B included in the tire 1.

The spoke 106 is a rod-like member extending in the tire radial direction. An end on the outer side in the tire radial direction of the spoke 106 is joined to the rim portion 104 and an end on the inner side in the tire radial direction of the spoke 106 is joined to the hub 107. The spoke 106 is disposed at a predetermined pitch in the tire circumferential direction.

The hub 107 is disposed in a center portion of the wheel 102 and attaches to an axle of the vehicle. The hub 107 is joined to the rim portion 104 via the plurality of spokes 106. The hub 107 and the axle of the vehicle are joined via a joining member 112 having a bolt and nut. The bolt of the joining member 112 is attached to the axle. Note that the configuration of the joining member 112 is not limited to that described above. Thus, the hub 107 rotates integrally with the axle. Also note that a joining direction of the hub 107 and the axle is a single, predetermined direction. Thereby, the wheel 102 has a structure in which a surface of the vehicle outer side and a surface of the vehicle inner side are established. In the wheel 102, the surface contacting the axle is the surface of the vehicle inner side, and the surface opposite the surface contacting the axle is the surface of the vehicle outer side.

The wheel disk 114 (wheel cover and wheel cap) is a disk-like member disposed on the vehicle outer side of the spoke 106, and an opening is formed in a region opposite the hub 107 at a center in the tire radial direction. In other words, the wheel disk 114 is a disk having a round hole formed in the center thereof. The wheel disk 114 is fixed to the spoke 106 and the hub 107, and rotates together with the spoke 106 and the hub 107. The wheel disk 114 of this embodiment has a form including the opening, but may also have a form covering an entire surface of the vehicle outer side of the wheel 102 (e.g. a round disk without an opening).

As illustrated in FIGS. 2 and 4, with the wheel 102, a plurality of the wheel recesses 120, which are recessed from a surface of the wheel disk 114 toward the vehicle inner side (inner side of the wheel 102), is provided in the surface of the vehicle outer side of the wheel disk 114. In FIG. 2, the surface of the wheel disk 114 is a uniformly continuing surface that is exposed to the vehicle outer side. That is, the wheel recesses 120 have a form that is recessed from the surface of the wheel disk toward the vehicle inner side and, as illustrated in FIG. 4, in a plane orthogonal to the tire width direction, form a single line wherein a boundary line with other portions is closed.

The wheel recesses 120 are disposed at a predetermined pitch in the tire radial direction and the tire circumferential direction in the surface of the wheel disk 114 and, more specifically, are disposed in rows. In the wheel 102, one recess row (wheel recess row) 125 is formed from a plurality of the wheel recesses 120 disposed in a row in the tire radial direction of the plurality of wheel recesses 120. Additionally, with the wheel 102, because a plurality of the wheel recesses 120 is disposed in rows in the tire circumferential direction, the recess rows 125 have a configuration in which they are disposed in line in the tire circumferential direction.

Figure 5:
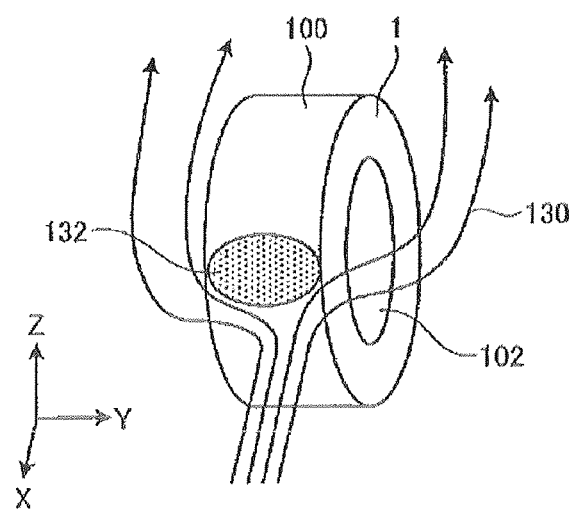
FIG. 5 is an explanatory drawing illustrating an example of the flow of air flowing around a tire/wheel assembly.
Figure 6A:
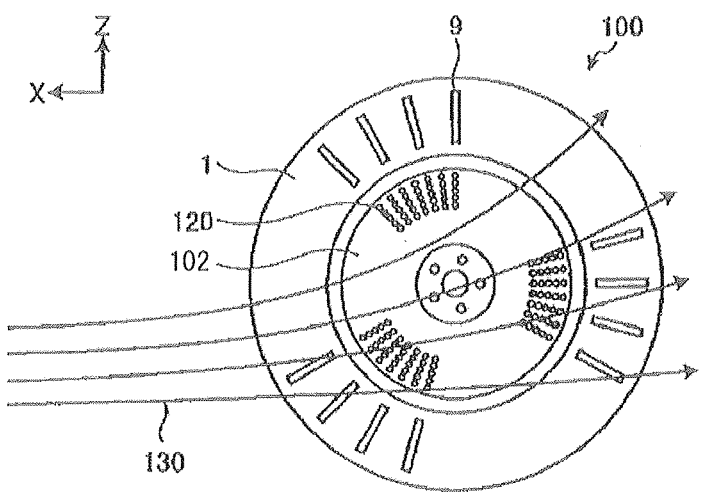
FIG. 6A is an explanatory drawing illustrating an example of the flow of air flowing around a tire/wheel assembly, seen from the vehicle outer side.
Figure 6B:
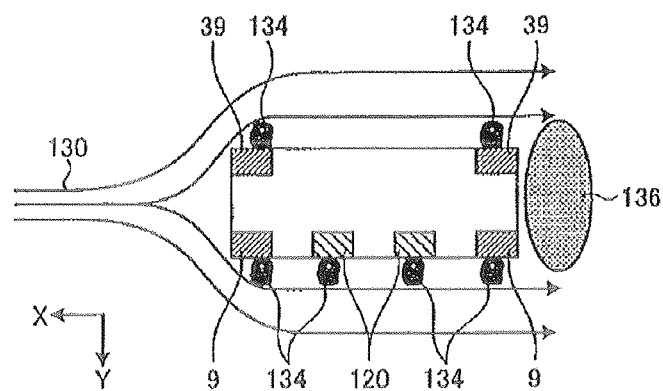
FIG. 6B is an explanatory drawing illustrating an example of the flow of air flowing around a tire/wheel assembly, seen from above the vehicle.
Figure 7A:
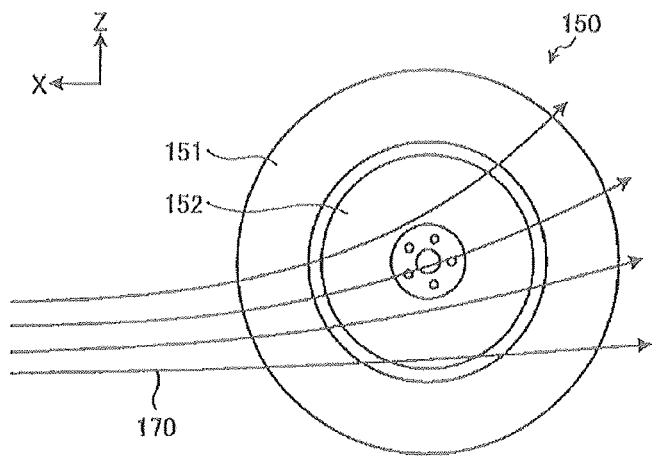
FIG. 7A is an explanatory drawing illustrating an example of the flow of air flowing around a tire/wheel assembly of a comparative assembly, seen from the vehicle outer side.
Figure 7B:
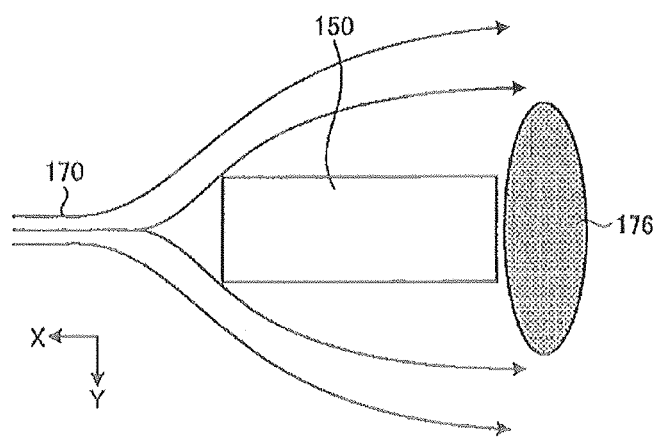
FIG. 7B is an explanatory drawing illustrating an example of the flow of air flowing around a tire/wheel assembly of the comparative assembly, seen from above the vehicle.

Next, the tire/wheel assembly 100 will be explained in further detail while referring to FIGS. 5 to 7B. FIG. 5 is an explanatory drawing illustrating an example of the flow of air flowing around the tire/wheel assembly. FIG. 6A is an explanatory drawing illustrating an example of the flow of air flowing around the tire/wheel assembly, seen from the vehicle outer side. FIG. 6B is an explanatory drawing illustrating an example of the flow of air flowing around the tire/wheel assembly, seen from above the vehicle. FIG. 7A is an explanatory drawing illustrating an example of the flow of air flowing around a tire/wheel assembly of a comparative assembly, seen from the vehicle outer side. FIG. 7B is an explanatory drawing illustrating an example of the flow of air flowing around the tire/wheel assembly of the comparative assembly, seen from above the vehicle. Additionally, the tire/wheel assembly 100 illustrated in FIGS. 5 to 6B and a tire/wheel assembly 150 illustrated in FIGS. 7A and 7B are both tire/wheel assemblies that are mounted as a left tire of a vehicle. Moreover, in FIGS. 5 to 7B, direction X is a direction parallel to the forward direction of the tire/wheel assembly and the forward direction of the tire/wheel assembly is referred to as positive. Direction Y is the tire width direction. Direction Z is a direction orthogonal to a road surface on which the pneumatic tire is placed.

As illustrated in FIG. 5, the tire/wheel assembly 100 moves relatively to the air around the tire/wheel assembly 100 by traveling and, as a result, air flow 130 is generated that flows from the front to the back of a traveling direction with respect to the tire/wheel assembly 100. The air flow (air layer) 130 is divided in the tire width direction at a separation region 132 that is formed from a portion at the front of the forward direction of the tread portion 2 of the tire/wheel assembly 100, and recirculates to side surfaces (the surface of the vehicle outer side and the surface of the vehicle inner side) of the tire/wheel assembly 100.

As illustrated in FIGS. 6A and 6B, the air flow 130 that recirculates to the side surface of the vehicle outer side of the tire/wheel assembly 100 forms a turbulent flow 134 that is formed in the vicinity of the tire/wheel assembly 100 by the tire protrusions 9 provided on the pneumatic tire 1. By being formed into the turbulent flow 134, the air flow 130 is converted to a state that flows easily along the side surface in the vicinity of the tire/wheel assembly 100. As a result, with the tire/wheel assembly 100, the air flow 130 that separated from the separation region 132 can be retained as-is in the vicinity of the side surface (buttress) of the tire/wheel assembly 100.

Additionally, the air flow 130 that passed the peripheral portions of the pneumatic tire 1, of the side surface of the tire/wheel assembly 100, is retained in proximity to the wheel recesses 120 by the wheel recesses 120 formed in the wheel 102, and forms the turbulent flow 134 that is formed in the vicinity of the tire/wheel assembly 100. By being formed into the turbulent flow 134, the air flow 130 is converted to a state that flows easily along the side surface in the vicinity of the tire/wheel assembly 100. As a result, with the tire/wheel assembly 100, the air flow 130 that separated from the separation region 132 can be retained as-is in the vicinity of the side surface (the wheel 102) of the tire/wheel assembly 100. Additionally, with the tire/wheel assembly 100, the air resistance reduction effect can be greatly enhanced by the air flow 130 being retained in the vicinity of the wheel 102.

The air flow 130 that recirculates to the side surface of the vehicle inner side of the tire/wheel assembly 100 forms a turbulent flow 134 that is formed in the vicinity of the tire/wheel assembly 100 by the tire protrusions 39 provided on the pneumatic tire 1. By being formed into the turbulent flow 134, the air flow 130 is converted to a state that flows easily along the side surface of the vehicle inner side in the vicinity of the tire/wheel assembly 100. As a result, with the tire/wheel assembly 100, the air flow 130 that separated from the separation region 132 can be retained as-is in the vicinity of the side surface (buttress) of the tire/wheel assembly 100.

Thus, with the tire/wheel assembly 100, a turbulent flow boundary layer is generated around the tire/wheel assembly 100 and, on the vehicle outer side, expansion of air passing by the vehicle outer side of the tire/wheel assembly 100 is suppressed; and, on the vehicle inner side, the expansion of air that escapes the vehicle outer side behind the vehicle of the tire/wheel assembly 100 is suppressed. As a result, with the tire/wheel assembly 100, the expansion of passing air can be suppressed and a separation region 136 behind the tire can be reduced.

With a tire/wheel assembly 150 such as that illustrated in FIGS. 7A and 7B, neither the tire protrusions nor the wheel recesses are disposed of the side surface of the vehicle outer side. In other words, the tire/wheel assembly 150 includes a pneumatic tire 151 that does not include tire recesses in the side surface of the vehicle outer side, and a wheel 152 that does not include wheel protrusions on the vehicle outer side. As illustrated in FIGS. 7A and 7B, air flow 170 that recirculates to the side surface on the vehicle outer side of the tire/wheel assembly 150 easily separates from the side surface of the vehicle outer side and flows in a direction gradually separating from the side surface of the tire/wheel assembly 150 because a component that reduces air resistance was not provided. In other words, the air flow 170 separates from the side surface of the tire/wheel assembly 150. As a result, with the tire/wheel assembly 150, passing air expands, and a separation region 176 behind the tire becomes larger.

As described above, with the tire/wheel assembly 100, the tire protrusions 9 and the wheel recesses 120 are provided of a side surface of the vehicle outer side and, therefore, the air resistance of the vehicle can be reduced and fuel economy can be further enhanced. More specifically, with the tire/wheel assembly 100, compared with cases where neither the tire protrusions 9 nor the wheel recesses 120 are provided, the air around (the pneumatic tire 1 and the wheel 102 of) the tire/wheel assembly 100 can more appropriately rectified by providing the tire protrusions 9 and the wheel recesses 120. Furthermore, with the tire/wheel assembly 100, compared to cases where only one of the tire protrusions 9 and the wheel recesses 120 is provided, by providing the tire protrusions 9 and the wheel recesses 120, a suitable turbulent flow 134 can be generated on the surface (the surface of the vehicle outer side of the pneumatic tire 1 and the wheel 102) of the vehicle outer side of the tire/wheel assembly 100 and aerodynamic performance can be enhanced dramatically over cases where the area was simply increased where the protrusions and the recesses are provided because the protrusions and the recesses can be respectively formed in a set range in the tire radial direction. Additionally, with the tire/wheel assembly 100, the tire protrusions 39 are provided in the side surface of the vehicle inner side and, therefore, the air resistance of the vehicle can be further reduced and fuel economy can be further enhanced.

Moreover, with the tire/wheel assembly 100, the wheel recesses 120 is provided in the wheel 102 and, therefore, the weight of the wheel 102 can be reduced and the weight of the tire/wheel assembly 100 can be reduced.

In the tire/wheel assembly 100, the tire protrusions 39 are provided on the vehicle inner side, but the configuration is not limited thereto. The tire/wheel assembly 100 may have a configuration where the tire protrusions 9 are provided only on the vehicle outer side and the tire protrusions 39 are not provided on the vehicle inner side. Note that, as described above, with the tire/wheel assembly 100, the turbulent flow 134 can also be suitably generated on the vehicle inner side because the tire protrusions 39 are provided on the vehicle inner side. Moreover, the tire protrusions 39 are preferably provided on the vehicle inner side because it will be possible to suppress the separation of the air flow, flowing on the vehicle inner side, from the side surfaces of the pneumatic tire 1 and the wheel 102. With the tire/wheel assembly 100, recesses (e.g. dimples) or, rather, the tire recesses may be provided in the vehicle inner side of the pneumatic tire.

Additionally, with the tire/wheel assembly 100 of this embodiment, the plurality of wheel recesses 120 of the wheel 102 becomes recess rows 125 disposed in rows in the tire radial direction, and the recess rows 125 are disposed at a pitch in the tire circumferential direction. According to the tire/wheel assembly 100, the air is made more turbulent by recesses (dimples) formed in rows in the tire radial direction, and the air is effectively made turbulent by disposing the rows in the circumferential direction. As a result, a prominent effect of making the air turbulent can be obtained. Thus, the wheel recesses 120 are preferably disposed in rows in the tire radial direction but the disposal is not limited thereto and the wheel recesses 120 may be disposed irregularly or in a staggered lattice manner.

With the tire/wheel assembly 100 of this embodiment, the tire protrusions 9 and 39 of the pneumatic tire 1 are formed with a longitudinal shape in the tire radial direction (i.e. a fin form), and are disposed at a pitch in the tire circumferential direction. According to the tire/wheel assembly 100, the air is made more turbulent by the protrusions formed with the longitudinal shape in the tire radial direction, and the air is effectively made turbulent by disposing the protrusions in the circumferential direction. As a result, a prominent effect of making the air turbulent can be obtained.

With the tire/wheel assembly 100, the surface of the vehicle outer side of the wheel 102 includes the wheel disk 114. Therefore, the surface of the wheel 102 can be configured to have a form in which the cavity is not exposed, and the aerodynamic performance of the tire can be further enhanced. That is, with the tire/wheel assembly 100, due to the wheel disk 114, the air flowing on the vehicle outer side can be suppressed from flowing into the tire/wheel assembly 100. As a result, disruptions in the air flow can be further reduced, the air resistance of the vehicle can be reduced, and the aerodynamic performance can be enhanced. Note that it is sufficient that the tire/wheel assembly has a form in which the surface of the vehicle outer side of the wheel 102 does not include an opening connecting with the cavity (the vehicle inner side of the tire/wheel assembly), and even in cases where the wheel disk 114 is not provided and the form of the spoke 106 is free of the cavity, the same effects can be obtained.

Next, preferable ranges of disposal positions of the tire protrusions 9 and the wheel recesses 120 will be described using FIGS. 2 and 3. With the tire/wheel assembly 100 of this embodiment, at least a portion of the tire protrusions 9 are preferably disposed at a position at least 10% or more of a tire cross-sectional height from a position where a tire cross-sectional width of the pneumatic tire 1 is greatest (position of maximum cross-sectional width $L_4$) toward the outer side in the tire radial direction. That is, where $d_1$ is the tire cross-sectional height of the pneumatic tire 1, at least a portion of the tire protrusions 9 are preferably formed in a region included in a height $d_3$ that is farther outward in the tire radial direction than an edge on the outer side in the tire radial direction of a region included in a height $d_2$ that corresponds to 10% of the tire cross-sectional height $d_1$ from the position where the tire cross-sectional width is greatest.

With the pneumatic tire 1, by disposing at least a portion of the tire protrusions 9 in the region of the height $d_3$, the tire protrusions 9 can be provided on a region, in the tire side portion S of the pneumatic tire 1, that is prone to receiving air resistance when traveling and where rotation speed is relatively fast. As a result, a point in the vicinity of the buttress where the turbulent flow separates when traveling can be offset backwards, and the overall air resistance of the tire can be reduced.

Additionally, where $D_1$ is a distance from an outer side edge in the tire radial direction of the rim portion 104, to which the pneumatic tire 1 is fixed, to a tire rotational axis, the wheel 102 preferably has a structure that does not include cavities (e.g. holes, openings) communicating with an edge surface of the vehicle inner side in a range from a position $0.4D_1$ outward in the radial direction from a center in the tire radial direction of the wheel 102 to the outer side edge in the tire radial direction. That is, with the wheel 102, a region corresponding to a distance $D_3$ that is farther outward in the radial direction than an edge on the outer side in the radial direction of a range corresponding to a distance $D_2$, which corresponds to $0.4 D_1$ outward in the radial direction from the center in the tire radial direction of the wheel 102, preferably has a structure that is free of cavities communicating with the edge surface of the vehicle inner side, rather, a structure that is free of cavities (e.g. holes, openings) that penetrate the tire equatorial plane CL side of the tire/wheel assembly 100. Thus, because the tire/wheel assembly 100 has a structure free of cavities in at least the region corresponding to the distance $D_3$, disturbances of the air flow passing on the side surface of the tire/wheel assembly 100 can be reduced, turbulent flow can be suitably generated on the side surface, and the air resistance can be reduced. Additionally, because the tire/wheel assembly 100 has a structure free of cavities in at least the region corresponding to the distance $D_3$, the region where the wheel recesses 120 can be formed in the surface of the vehicle outer side of the wheel 102 can be made larger on the outer side in the tire radial direction. As a result, more of the wheel recesses 120 can be formed at appropriate positions, and the air resistance can be more advantageously reduced.

Additionally, with the wheel 102, where $D_1$ is the distance from the outer side edge in the tire radial direction of the rim portion 104, to which the pneumatic tire 1 is fixed, to the tire rotational axis, preferably at least a portion of the wheel recesses 120 are disposed in a region from the outer side edge in the tire radial direction of the rim portion 104 to a position displaced $0.1D_1$ inward in the tire radial direction starting from the outer side edge. That is, as illustrated in FIGS. 2, 7A and 7B, preferably at least a portion of the wheel recesses 120 are provided in the region included in the distance $D_4$ that is the distance $0.1D_1$ from the outer side edge in the tire radial direction of the rim portion 104. Thus, by providing the wheel recesses 120 in the region in the surface of the wheel 102 where the rotation speed is relatively fast, the position where the turbulent flow separates in the vicinity of the wheel 102 can be further offset to the back of the tire/wheel assembly 100, and the overall air resistance of the tire/wheel assembly 100 can be reduced.

Additionally, with the tire/wheel assembly 100, where $L_1$ is a distance in the tire width direction from a tire equatorial plane CL of the pneumatic tire 1 to an edge of the vehicle outer side of the pneumatic tire 1, and $L_2$ is a distance in the tire width direction from the tire equatorial plane CL of the pneumatic tire 1 to the edge of the vehicle outer side of the wheel 102, the distance $L_1$ and the distance $L_2$ preferably have a relationship such that $L_2 \leq 1.2L_1$ is satisfied. Note that in FIG. 2, the distance represented by $1.2L_1$ is indicated as distance $L_3$. Thus, in FIG. 2, it is sufficient that the relationship between the distance $L_2$ and the distance $L_3$ be such that $L_2 \leq L_3$. When the pneumatic tire 1 and the wheel 102 satisfy the relationship described above, the expansion of air toward the back of the tire protrusions 9 that is generated in the pneumatic tire 1 can be suppressed and the effect rectifying the air can be more advantageously obtained. Note that the distance $L_1$ is a distance from the tire equatorial plane CL to the edge of the vehicle outer side of the pneumatic tire 1. Therefore, in cases where the outermost position in the width direction of the tire protrusions 9 is outward in the width direction of the outer side edge in the width direction of the tire maximum width, the distance from the tire equatorial plane CL to the outermost portion in the width direction of the tire protrusions 9 is the distance $L_1$, and in cases where the outermost edge in the width direction of the tire maximum width is outward in the width direction of the outermost position in the width direction of the tire protrusions 9, the distance of one-half of the tire maximum width is the distance $L_1$.

Next, using FIGS. 8A to 11F, other embodiments of the forms of the tire protrusions and the shape of wheel recesses will be described. The tire protrusions and the wheel recesses can have a variety of forms. Here, the tire protrusions preferably have a narrow and long form in which the tire radial direction is the longitudinal direction, that is, a fin form. The aerodynamic performance can be advantageously enhanced by configuring the tire protrusions to have a fin form. Additionally, the wheel recesses preferably are arranged in rows where the tire radial direction is the arrangement direction. That is, the wheel recesses are preferably disposed so that an extending direction of one of the recess rows is oriented in the tire radial direction.

FIGS. 8A to 8F are partial appearance views of a tire/wheel assembly of other embodiments, seen from the vehicle outer side. Here, FIGS. 8A to 8F illustrate examples of the forms of the tire protrusions and the wheel recesses when the tire/wheel assembly is seen from the vehicle outer side. With a tire/wheel assembly 300 illustrated in FIG. 8A, tire recesses 303 formed in a pneumatic tire 301 have a linear form extending in the tire radial direction, and recess rows 308 formed from wheel recesses 304 provided in a wheel 302 have a linear form extending in the tire radial direction. Additionally, an opening shape of the wheel recesses 304 that open to the surface of the vehicle outer side of the wheel 302 is circular. Tire protrusions 313 formed in a pneumatic tire 311 of a tire/wheel assembly 310 illustrated in FIG. 8B have a linear form including a bent portion in the vicinity of the center in the tire radial direction (in a form where two straight lines having different angles are joined at an orientation that is convex in the tire circumferential direction), and wheel recess rows 318 formed from wheel recesses 314 provided in a wheel 312 have a linear form including a bent portion in a center portion in the tire radial direction. Additionally, an opening shape of the wheel recesses 314 that open to the surface of the vehicle outer side of the wheel 312 is circular. Tire protrusions 323 formed on a pneumatic tire 321 of a tire/wheel assembly 320 illustrated in FIG. 8C have an arc form extending in the tire radial direction and convex in the tire circumferential direction, and recess rows 328 formed from wheel recesses 324 provided in a wheel 322 have an arc form extending in the tire radial direction and convex in the tire circumferential direction. Additionally, an opening shape of the wheel recesses 324 that open to the surface of the vehicle outer side of the wheel 322 is circular. Thus, the tire protrusions and the wheel recesses can have a variety of forms such as linear, curved, bent partway through, and similar forms. Additionally, the recess rows formed from the wheel recesses and the tire protrusions may have a plurality of the bends or curves.

Figure 8A:
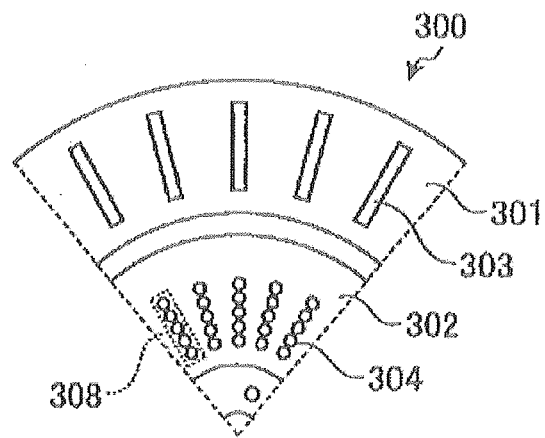
FIG. 8A is a partial appearance view of a tire/wheel assembly of another embodiment, seen from the vehicle outer side.
Figure 8B:
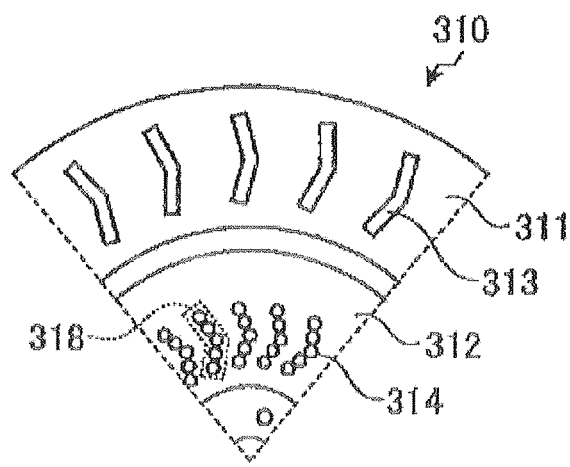
FIG. 8B is a partial appearance view of a tire/wheel assembly of another embodiment, seen from the vehicle outer side.
Figure 8C:
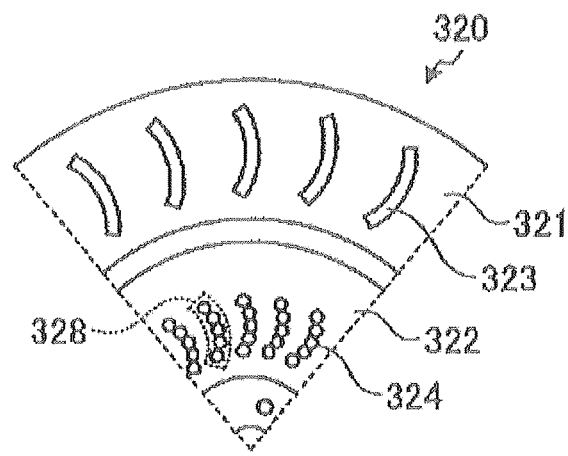
FIG. 8C is a partial appearance view of a tire/wheel assembly of another embodiment, seen from the vehicle outer side.
Figure 8D:
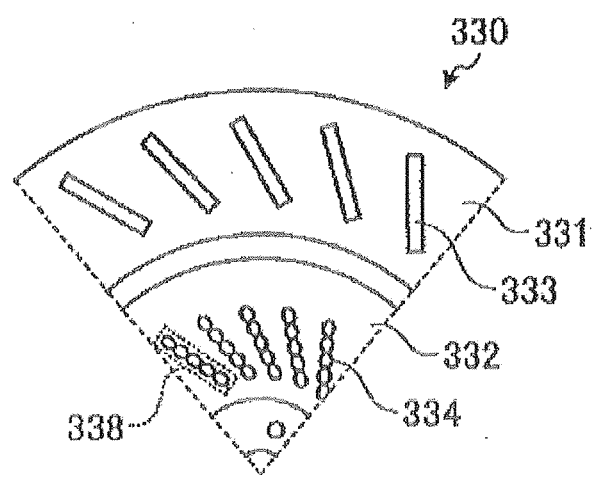
FIG. 8D is a partial appearance view of a tire/wheel assembly of another embodiment, seen from the vehicle outer side.

Tire protrusions 333 formed on a pneumatic tire 331 of a tire/wheel assembly 330 illustrated in FIG. 8D have a linear form extending in a direction inclined at predetermined angle with respect to a direction parallel to the tire radial direction, and recess rows 338 formed from wheel recesses 334 provided in a wheel 332 have a linear form inclined at the same inclination angle as the tire protrusions 333 with respect to the direction parallel to the tire radial direction. Additionally, an opening shape of the wheel recesses 334 that open to the surface of the vehicle outer side of the wheel 332 is oval.

Thus, the recess rows formed from the wheel recesses and the tire protrusions may have a form that is inclined at a predetermined angle with respect to the tire radial direction.

Figure 8E:
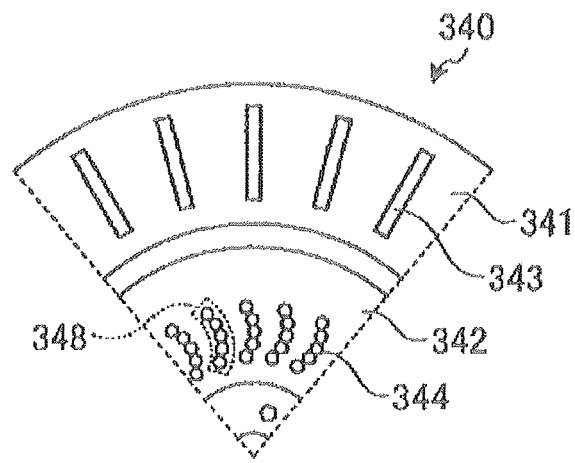
FIG. 8E is a partial appearance view of a tire/wheel assembly of another embodiment, seen from the vehicle outer side.
Figure 8F:
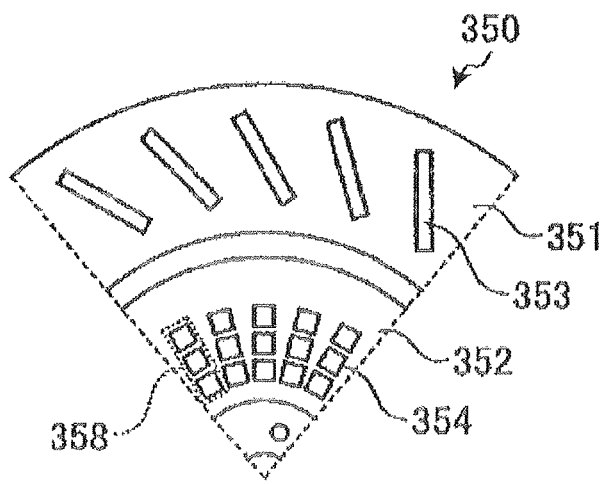
FIG. 8F is a partial appearance view of a tire/wheel assembly of another embodiment, seen from the vehicle outer side.

Tire protrusions 343 formed on a pneumatic tire 341 of a tire/wheel assembly 340 illustrated in FIG. 8E have an linear form extending in the tire radial direction, and recess rows 348 formed from wheel recesses 344 provided in a wheel 342 have an arc form extending in the tire radial direction and convex in the tire circumferential direction. Additionally, an opening shape of the wheel recesses 344 that open to the surface of the vehicle outer side of the wheel 342 is circular. Tire protrusions 353 formed on a pneumatic tire 351 of a tire/wheel assembly 350 illustrated in FIG. 8F have a linear form extending in a direction inclined at predetermined angle with respect to a direction parallel to the tire radial direction, and recess rows 358 formed from wheel recesses 354 provided in a wheel 352 have a linear form extending in the tire radial direction. Additionally, an opening shape of the wheel recesses 354 that open to the surface of the vehicle outer side of the wheel 352 is quadrangular. Thus, the recess rows formed from the wheel recesses and the tire protrusions may have a combination of different forms. That is, with the tire/wheel assembly, the form of the tire protrusions and the form of the wheel recesses may be configured to be different forms. Additionally, an opening shape of the wheel recesses that open to the surface of the vehicle outer side of the wheel 352 may be a circular, oval, elliptical, polygonal, or similar form.

Figure 9A:
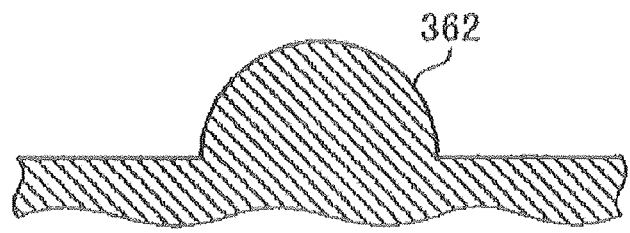
FIG. 9A is a cross-sectional view of an example of a tire protrusion.
Figure 9B:
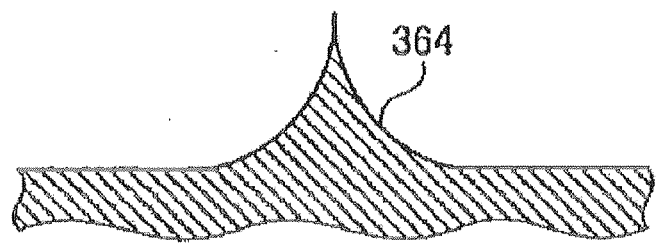
FIG. 9B is a cross-sectional view of an example of a tire protrusion.
Figure 9C:
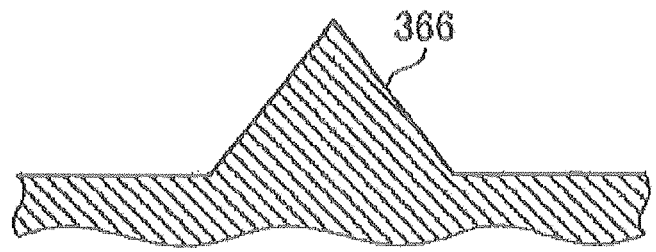
FIG. 9C is a cross-sectional view of an example of a tire protrusion.
Figure 9D:
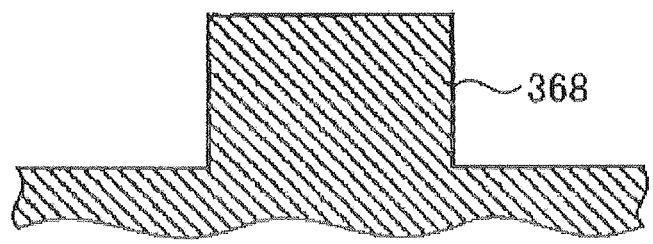
FIG. 9D is a cross-sectional view of an example of a tire protrusion.

Each of FIGS. 9A to 9D is a cross-sectional view of an example of a tire protrusion. Here, FIGS. 9A to 9D illustrate a cross-sectional shape that crosses the longitudinal direction. The cross-sectional shape of a tire protrusion 362 illustrated in FIG. 9A is semi-circular. The cross-sectional shape of a tire protrusion 364 illustrated in FIG. 9B is a combination of two arcs (¼ of a circle) that is convex at the center of the tire protrusion 364. The cross-sectional shape of a tire protrusion 366 illustrated in FIG. 9C is triangular. The cross-sectional shape of a tire protrusion 368 illustrated in FIG. 9D is quadrangular. The cross-sectional shape of the tire protrusions is not limited thereto, and may have a semi-oval form, a semi-elliptical form, a trapezoidal form, or the like, or a form including a combination of a straight line and a curved line.

Here, as illustrated in FIG. 9C, the cross-sectional shape of the tire protrusion is preferably substantially triangular having a peak. Examples of the cross-sectional shape that is substantially triangular having a peak include various forms in which the cross-sectional width decreases with distance from the side wall including the triangular form such as that illustrated in FIG. 9C, a form in which the peak of the triangular form is chamfered, a form in which the peak of the triangular form has a curved R-like shape, and the like. By configuring the cross-sectional shape of the tire protrusions of the tire/wheel assembly to be substantially triangular having a peak, a ratio of a protruding amount from the surface of the tire side portion S with respect to an area of the cross-sectional shape can be increased, and aerodynamic performance can be enhanced while suppressing an increase in the volume of the tire protrusions. As a result, fuel economy can be enhanced.

Additionally, as illustrated in FIGS. 9A and 9B, the tire protrusions are preferably configured so that the cross-sectional shape thereof is formed from at least one or more arcs. By configuring the cross-sectional shape of the tire protrusions of the tire/wheel assembly to be formed from at least one or more arcs, the ratio of the protruding amount from the surface of the tire side portion S with respect to the area of the cross-sectional shape can also be increased, and aerodynamic performance can be enhanced while suppressing an increase in the volume of the tire protrusions. As a result, fuel economy can be enhanced.

Furthermore, the cross-sectional shape in the longitudinal direction of the tire protrusions may be formed so as to be uniform, or the cross-sectional shape in the longitudinal direction may be formed so as to vary. An edge of the tire protrusions may protrude smoothly from the surface of the tire side portion S of the pneumatic tire or may protrude abruptly from the surface of the tire side portion S of the pneumatic tire. The tire protrusions of the embodiment described above are formed as single protrusions in the tire radial direction on the surface of the tire side portion S, but may be plurally divided in the longitudinal direction. In cases where the tire protrusions are divided, other tire protrusions lined up in the tire circumferential direction thereof may be disposed so as to overlap, in the tire circumferential direction, a division of a tire protrusion adjacent in the tire circumferential direction.

Figure 10A:
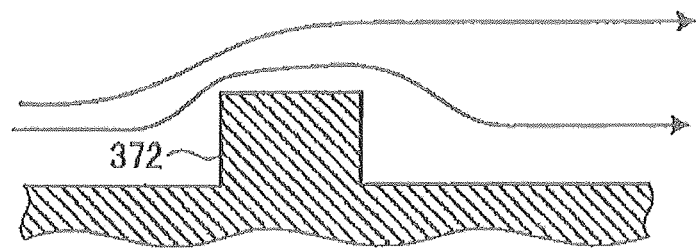
FIG. 10A is an explanatory drawing illustrating the flow of air around a tire protrusion having a height in the prescribed range.
Figure 10B:
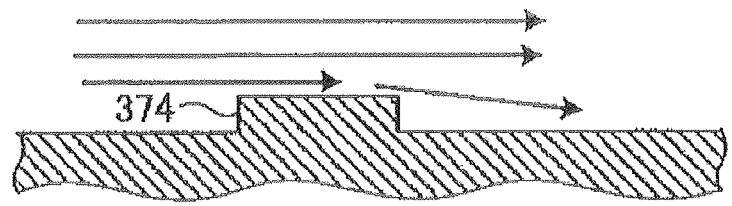
FIG. 10B is an explanatory drawing illustrating the flow of air around a tire protrusion having a height that is less than or equal to the prescribed range.
Figure 10C:
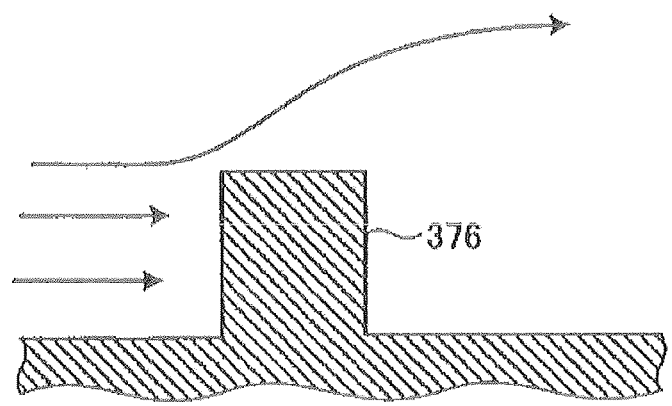
FIG. 10C is an explanatory drawing illustrating the flow of air around a tire protrusion having a height that is greater than or equal to the prescribed range.

A height of the tire protrusions protruding from the surface of the tire side portion S of the pneumatic tire of this embodiment is preferably not less than 0.5 mm and not more than 10 mm. FIG. 10A is an explanatory drawing illustrating the flow of air around a protrusion having a height in the prescribed range. FIG. 10B is an explanatory drawing illustrating the flow of air around a protrusion having a height that is less than or equal to the prescribed range. FIG. 10C is an explanatory drawing illustrating the flow of air around a protrusion having a height that is greater than or equal to the prescribed range. In cases when the pneumatic tire of the tire/wheel assembly is a passenger car tire, the form is preferably within the ranges described above. In cases where the pneumatic tire of the tire/wheel assembly is a heavy duty tire, the form of the tire protrusions is preferably within the ranges described above, but it may be preferable to configure the form of the tire protrusions so as to be greater than the ranges described above.

As illustrated in FIG. 10A, with the pneumatic tire, in cases where the height of tire protrusions 372 is within the specified range, the tire protrusions 372 appropriately contact the flow of air, and the expansion of air caused by the flow of air being made turbulent at the back of the tire protrusions 372 can be reduced. Therefore, a prominent effect of reducing the air resistance of the vehicle can be obtained. In contrast, as illustrated in FIG. 10B, with the pneumatic tire, in cases where the height of tire protrusions 374 is less than or equal to the specified range, that is, in cases where the height of the tire protrusions 374 is less than 0.5 mm, the range where the tire protrusions 374 contact the flow of air will be small and, as a result, it will be difficult to make the flow of air at the back of the tire protrusions 374 turbulent, and the effect of reducing the air resistance of the vehicle will decline. Additionally, as illustrated in FIG. 10C, with the pneumatic tire, in cases where the height of tire protrusions 376 is greater than or equal to the specified range, that is, in cases where the height of the tire protrusions 376 exceeds 10 mm, the range where the tire protrusions 376 contact the flow of air will increase and, as a result, it will be difficult to make the flow of air at the back of the tire protrusions 376 turbulent, and the effect of reducing the air resistance of the vehicle will decline.

The height of the tire protrusions protruding from the surface of the tire side portion S of the pneumatic tire of this embodiment is more preferably not less than 1 mm and not more than 5 mm. The effects described above can be more advantageously obtained by configuring the height of the tire protrusions to be not less than 1 mm and not more than 5 mm.

Figure 11A:
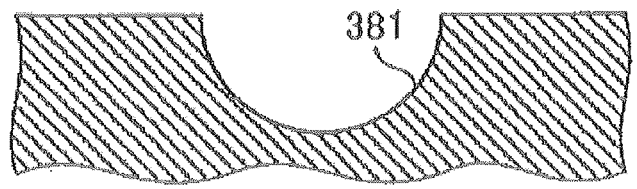
FIG. 11A is a cross-sectional view of an example of a wheel recess.
Figure 11B:
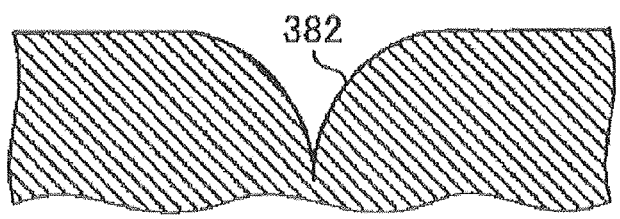
FIG. 11B is a cross-sectional view of an example of a wheel recess.
Figure 11C:
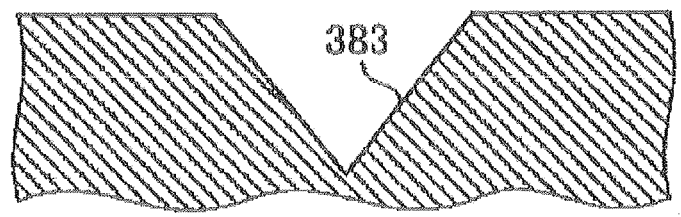
FIG. 11C is a cross-sectional view of an example of a wheel recess.
Figure 11D:
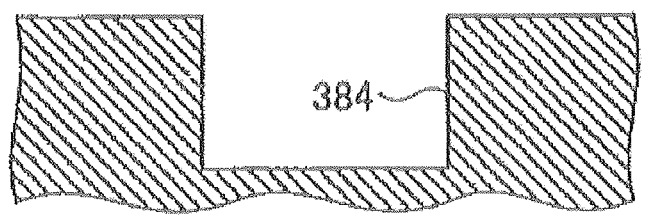
FIG. 11D is a cross-sectional view of an example of a wheel recess.
Figure 11E:
FIG. 11E is a cross-sectional view of an example of a wheel recess.
Figure 11F:
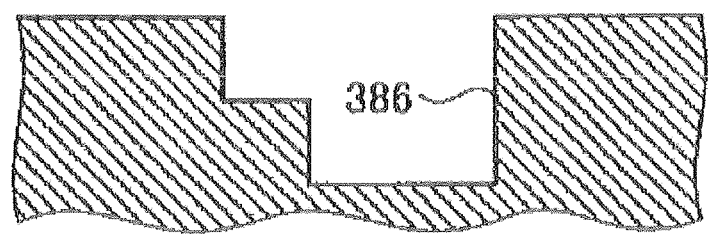
FIG. 11F is a cross-sectional view of an example of a wheel recess.

Next, a form of the wheel recesses will be described. Each of FIGS. 11A to 11F is a cross-sectional view of an example of a wheel recess. FIGS. 11A to 11F illustrate a cross-sectional shape (a cross-sectional shape parallel to the tire width direction). The cross-sectional shape of a wheel recess 381 illustrated in FIG. 11A is semi-circular. The cross-sectional shape of a wheel recess 382 illustrated in FIG. 11B is a combination of two arcs (¼ of a circle) that is concave at the center of the tire protrusion 382. The cross-sectional shape of a wheel recess 383 illustrated in FIG. 11C is triangular. The cross-sectional shape of a wheel recess 384 illustrated in FIG. 11D is quadrangular. The cross-sectional shape of a wheel recess 385 illustrated in FIG. 11E is asymmetric and a first side wall is inclined and a second side wall is orthogonal to the side wall portion. The cross-sectional shape of a wheel recess 386 illustrated in FIG. 11F includes a step, that is, a depth varies at a predetermined position between a first edge and a second edge of the wheel recess 386. The cross-sectional shape of the wheel recess is not limited thereto, and may have a semi-oval form, a semi-elliptical form, a rounded cone form, a trapezoidal form, or the like, or a form including a combination of a straight line and a curved line.

With the wheel, the wheel recesses are preferably configured so that a depth from the surface of the vehicle outer side is not less than 0.5 mm and not more than 5.0 mm. By configuring the depth of the wheel recesses to be not less than 0.5 mm, the turbulent flow generation effect can be sufficiently produced, and by configuring the depth to be not more than 5.0 mm, thickness of the side surface of the wheel can be sufficiently ensured. In order to make the air turbulent and reduce heat buildup, the depth of the wheel recesses is preferably made as deep as possible, but if a bottom of the wheel recesses is excessively close to the surface of the inner side in the tire radial direction of the wheel disk, a thickness therebetween will decrease and the decline of wheel disk durability will become a problem. Therefore, the depth of the wheel recesses from the surface of the vehicle outer side is preferably not more than 5.0 mm.

Additionally, with the wheel, a maximum diameter of the wheel recesses in the surface of the vehicle outer side is preferably not less than 1.0 mm and not more than 8.0 mm. By configuring the maximum diameter of the wheel recesses in the surface of the vehicle outer side to be not less than 1.0 mm and not more than 8.0 mm, a turbulent flow can be advantageously generated.

With the tire/wheel assembly, the tire protrusions and the wheel recesses are preferably provided in the entire periphery in the tire circumferential direction. Such a tire/wheel assembly can be easily manufactured, variation in position in the tire circumferential direction can be suppressed and performance as a tire can be further enhanced. The effects described above can be obtained by providing the tire protrusions and the wheel recesses in the entire periphery of the tire circumferential direction, but it is sufficient that the tire protrusions and the wheel recesses be provided in a portion of the tire circumferential direction.

With the tire/wheel assembly, in cases where the tire protrusions are disposed in a partial angular range in the tire circumferential direction, the wheel recesses are preferably disposed in at least an entirety of the angular range where the tire protrusions are not formed. Moreover, the wheel recesses are more preferably disposed in the entire angular range where the tire protrusions are not disposed and in the angular range where the tire protrusions are disposed in the tire circumferential direction. That is, the wheel recesses are preferably disposed in at least a portion in the tire circumferential direction where the tire protrusions are not formed. Thus, by disposing the wheel recesses also in the region in the tire circumferential direction where the tire protrusions are not formed, even in cases where a product name or other alphanumeric information is displayed on the side wall portion of the pneumatic tire and a region exists where the tire protrusions are not formed, the aerodynamic performance can be effectively enhanced. Additionally, with the tire/wheel assembly, by disposing the wheel recesses also in a region in the tire circumferential direction where the tire protrusions are disposed, the aerodynamic performance can be enhanced.

With the tire/wheel assembly, the tire protrusions are preferably disposed at a position where a center line overlaps a center line extended outward in the radial direction of a center line of the recess rows formed from the wheel recesses. That is, with the tire/wheel assembly, a phase of the tire protrusions and a phase of the recess rows formed from the wheel recesses preferably match in the tire circumferential direction. With the tire/wheel assembly, the aerodynamic performance can be further enhanced by regularly arranging the tire protrusions and the recess rows formed from the wheel recesses.

Figure 12:
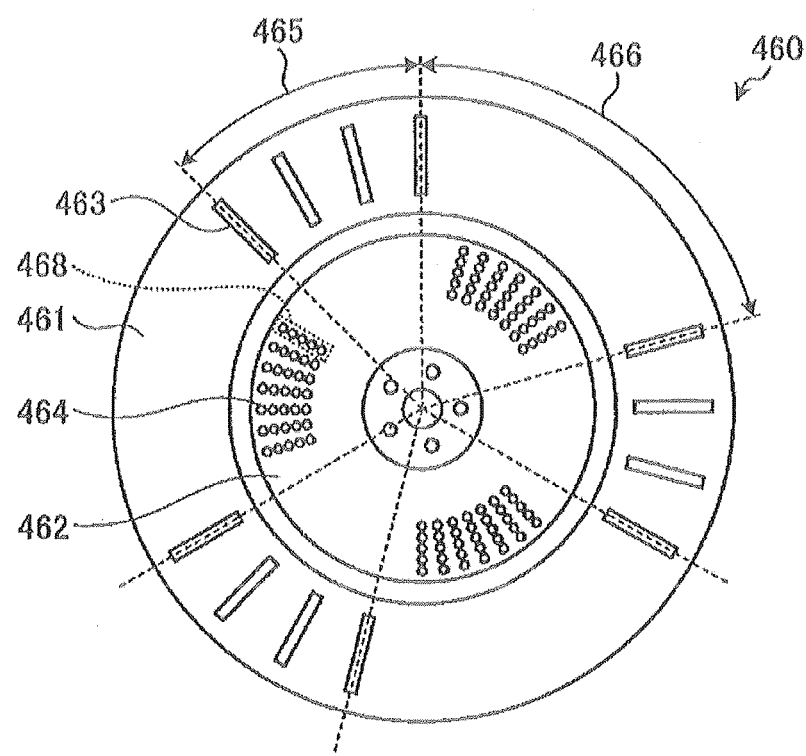
FIG. 12 is an appearance view of a tire/wheel assembly of another embodiment, seen from the vehicle outer side.
Figure 13:
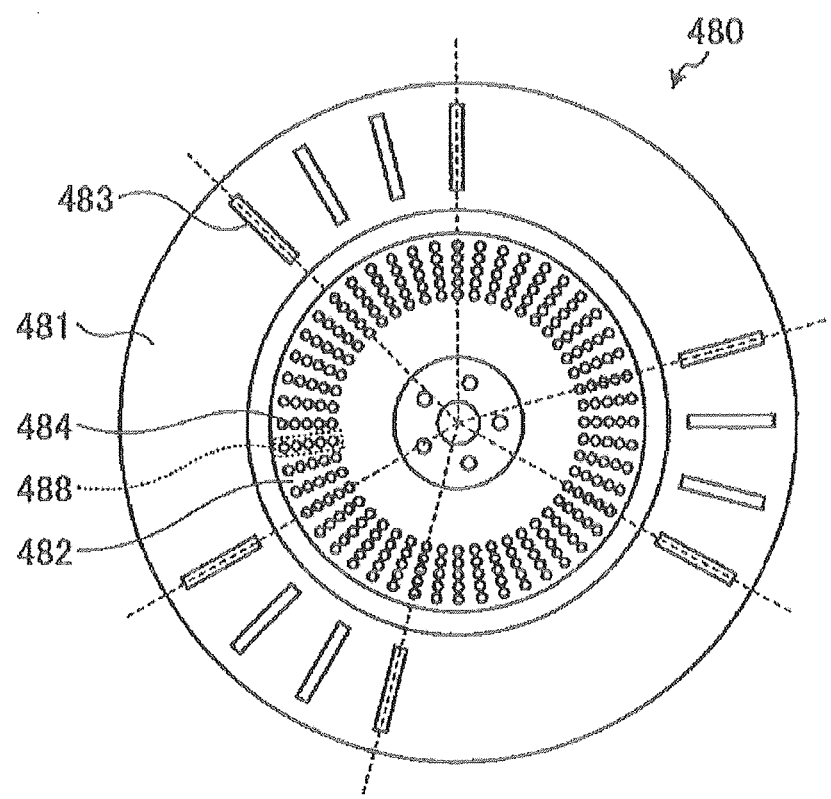
FIG. 13 is an appearance view of a tire/wheel assembly of another embodiment, seen from the vehicle outer side.

Next, a specific explanation will be given using FIGS. 12 and 13. FIGS. 12 and 13 are appearance views of a tire/wheel assembly of other embodiments, seen from the vehicle outer side. With a tire/wheel assembly 460 illustrated in FIG. 12, tire protrusions 463 are disposed on a pneumatic tire 461 and wheel recesses 464 are disposed in a wheel 462. The tire protrusions 463 have a linear form extending in the tire radial direction and a plurality thereof is disposed so as to be adjacent in the tire circumferential direction. With the pneumatic tire 461, a region 465 on which a plurality of the tire protrusions 463 are disposed so as to be adjacent at a predetermined pitch in the tire circumferential direction and a region 466 on which the tire protrusions 463 are not disposed are alternately disposed in the tire circumferential direction. Recess rows 468 formed from the wheel recesses 464 have a linear form extending in the tire radial direction and a plurality thereof is disposed so as to be adjacent in the tire circumferential direction. With the wheel 462, the recess rows 468 are not disposed in the region 465 on which the tire protrusions 463 are disposed, and a plurality of the recess rows 468 are disposed in the region 466 on which the tire protrusions 463 are not disposed in the tire circumferential direction.

As illustrated in FIG. 12, with the tire/wheel assembly, the aerodynamic performance can be enhanced by disposing the wheel recesses in the entire angular range in the tire circumferential direction in which the tire protrusions are not disposed.

With a tire/wheel assembly 480 illustrated in FIG. 13, tire protrusions 483 are disposed on a pneumatic tire 481 and wheel recesses 484 are disposed in a wheel 482. The tire protrusions 483 have a linear form extending in the tire radial direction and a plurality thereof is disposed so as to be adjacent in the tire circumferential direction. With the pneumatic tire 481, a region on which a plurality of the tire protrusions 483 are disposed so as to be adjacent at a predetermined pitch in the tire circumferential direction and a region on which the tire protrusions 483 are not disposed are alternately disposed in the tire circumferential direction. Recess rows 488 formed from the wheel recesses 484 have a linear form extending in the tire radial direction and a plurality thereof is disposed so as to be adjacent in the tire circumferential direction. With the wheel 482, a plurality of the recess rows 484 are disposed with a predetermined pitch in the tire circumferential direction in an entirety of the tire circumferential direction so as to be adjacent. With the tire/wheel assembly 480, the tire protrusions 483 are disposed at a position where the center line overlaps the center line extended outward in the radial direction of the center line of the recess rows 488 formed from the wheel recesses 484 in the region on which the tire protrusions 483 are not disposed. That is, the tire protrusions 483 are disposed at positions where an extended line of the center line overlaps the center line of any of the recess rows 488 disposed in the wheel 482.

As illustrated in FIG. 13, with the tire/wheel assembly, the aerodynamic performance can be enhanced by disposing the wheel recesses in the entire angular range in the tire circumferential direction in which the tire protrusions are not disposed and in the angular range where the tire protrusions are disposed. With the tire/wheel assembly, the aerodynamic performance can be enhanced by disposing the recess rows formed from the wheel recesses at the position where the center line overlaps a center line extended outward in the radial direction of a center line of the wheel recesses. Note that in FIG. 13, the tire protrusions 463 and the recess rows 488 have a linear form extending parallel to the tire radial direction, but, by configuring the form so that the center lines overlap, the same effects can be obtained even in cases where the tire protrusions and the recess rows have a form inclined at a predetermined angle with respect to the tire radial direction, or when the tire protrusions and the recess rows have an arc-like or bent form.

In the wheel, a distance in a tire width direction from a center in a width direction (tire equatorial plane) of the tire to an edge surface of the vehicle outer side preferably increases with progression from the outer side in the tire radial direction toward the inner side in the tire radial direction.

Figure 14:
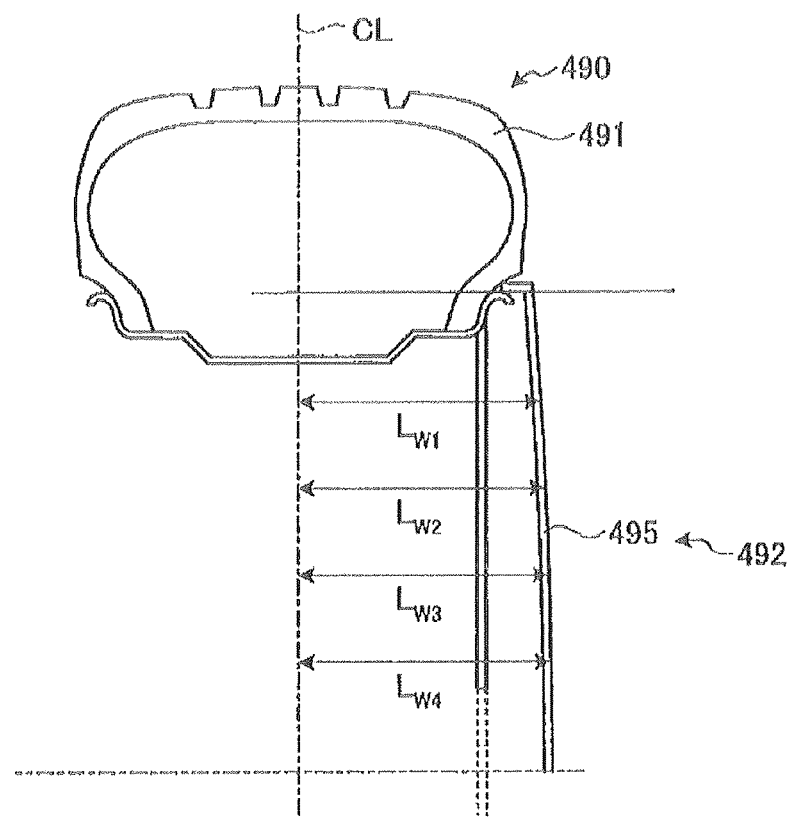
FIG. 14 is a meridian cross-sectional view of a tire/wheel assembly according to another embodiment.

Next, a description using FIG. 14 will be given. FIG. 14 is a meridian cross-sectional view of a tire/wheel assembly according to another embodiment. A tire/wheel assembly 490 illustrated in FIG. 14 includes a pneumatic tire 491 and a wheel 492. A wheel disk 495 is attached to an edge surface of the vehicle outer side of the wheel 492. The wheel disk 495 has a form in which a distance in the tire width direction from a center in a width direction (tire equatorial plane CL) of the tire to an edge surface of the vehicle outer side increases with progression from the outer side in the tire radial direction toward the inner side in the tire radial direction. That is, where $L_{W1}$ is a distance from the tire equatorial plane CL at a first position on the outer side in the tire radial direction to the edge surface of the vehicle outer side, $L_{W2}$ is a distance from the tire equatorial plane CL at a second position that is inward in the tire radial direction of the first position to the edge surface of the vehicle outer side, $L_{W3}$ is a distance from the tire equatorial plane CL at a third position that is inward in the tire radial direction of the second position to the edge surface of the vehicle outer side, and $L_{W4}$ is a distance from the tire equatorial plane CL at a fourth position that is inward in the tire radial direction of the third position to the edge surface of the vehicle outer side, $L_{W1}<L_{W2}<L_{W3}<L_{W4}$. Thus, a form of the edge surface of the vehicle outer side of the wheel (the wheel disk in this embodiment) is configured to expand gradually toward the vehicle outer side with progression toward the inner side in the tire radial direction and, therefore, the air flow can flow more smoothly from the pneumatic tire to the wheel and air resistance can be further reduced. Note that with the wheel, the effects described above can be obtained by configuring a form of the edge surface of the vehicle outer side of the wheel (the wheel disk in this embodiment) at least in a region in which cavities are not formed, specifically, where $D_1$ is a distance from the outer side edge in the tire radial direction of the rim portion, to which the pneumatic tire is fixed, to the tire rotational axis, in a region corresponding to the distance $D_3$ that is outward in the radial direction from all edge on the outer side in the radial direction of a range corresponding to a distance $D_2$ that corresponds to $0.4D_1$ outward in the radial direction from the center in the tire radial direction of the wheel, so as to gradually expand toward the vehicle outer side with progression toward the inner side in the tire radial direction.

With the tire/wheel assembly of the embodiment described above, the tire protrusions are provided on the tire side portion S of the pneumatic tire, but tire recesses the same as the wheel recesses may also be provided in the tire side portion S of the pneumatic tire.

Figure 15:
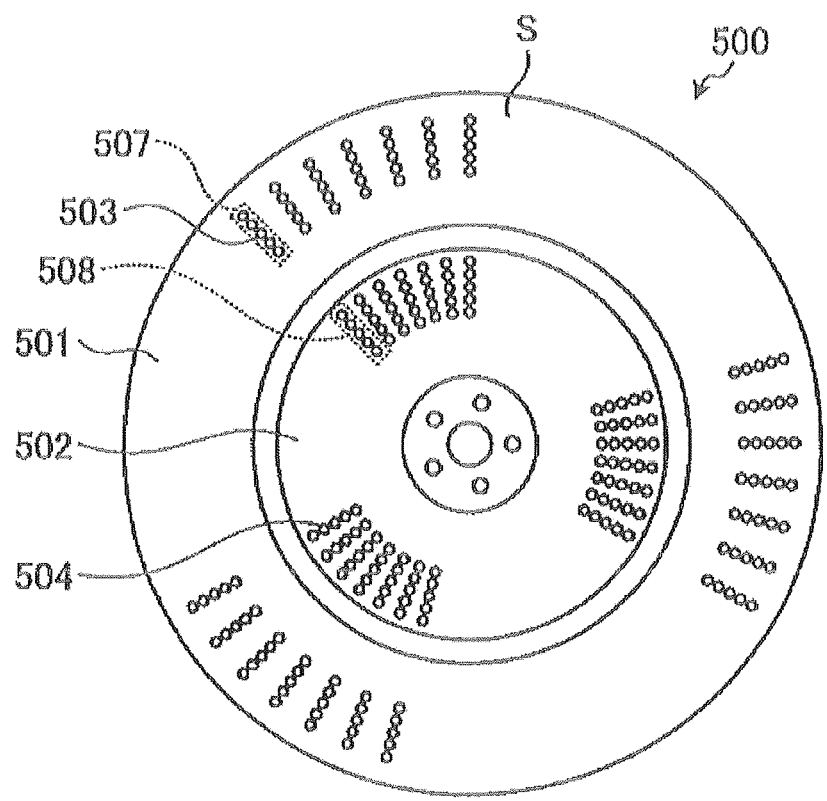
FIG. 15 is an appearance view of a tire/wheel assembly according to another embodiment, seen from a vehicle outer side.
Figure 16:
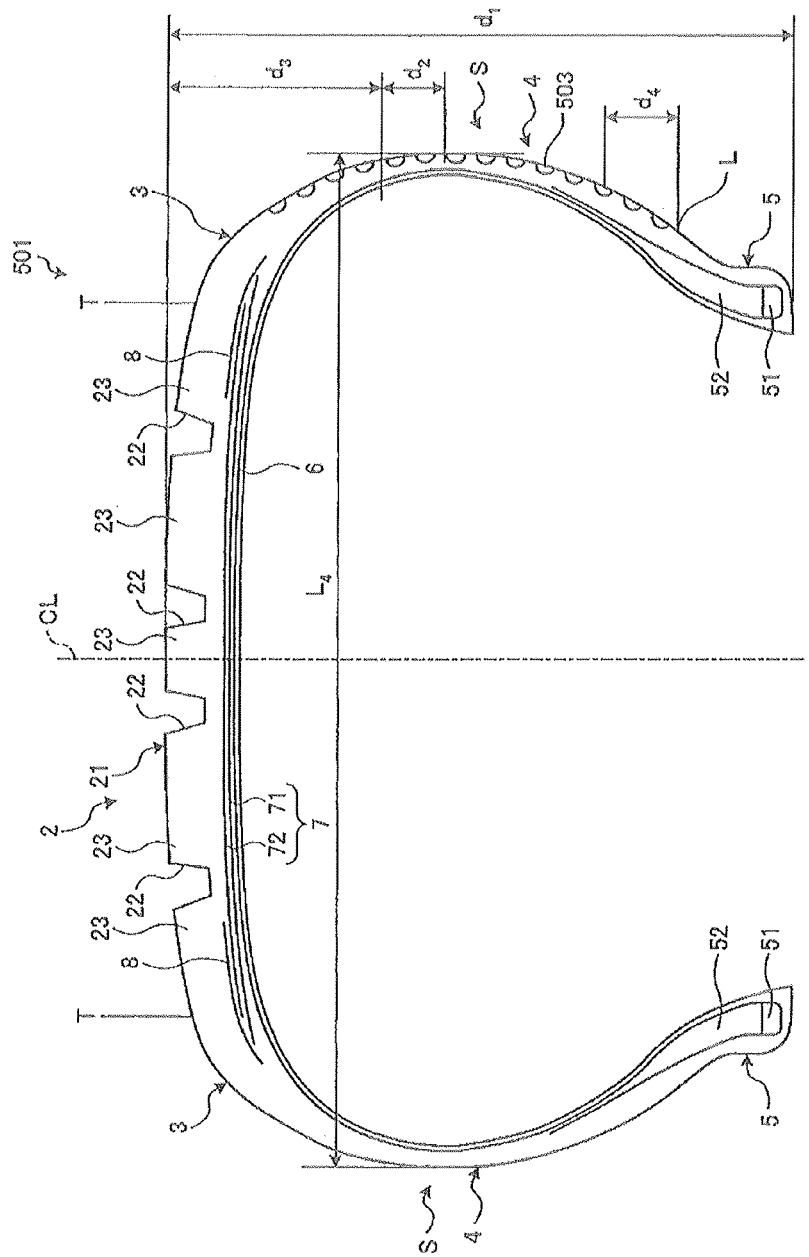
FIG. 16 is a meridian cross-sectional view of the pneumatic tire depicted in FIG. 15.

Next, a description will be given using FIGS. 15 and 16. FIG. 15 is a partial appearance view of a tire/wheel assembly according to another embodiment, seen from a vehicle outer side. FIG. 16 is a meridian cross-sectional view of the pneumatic tire depicted in FIG. 15. A tire/wheel assembly 500 illustrated in FIGS. 15 and 16, has a configuration that is fundamentally the same as that of the tire/wheel assembly 100, with the exception that tire recesses are provided in place of the tire protrusions in a pneumatic tire 501. The tire/wheel assembly 500 includes the pneumatic tire 501 and a wheel 502. A plurality of tire recesses 503 is formed in the tire side portion S of the pneumatic tire 501. A plurality of wheel recesses 504 is formed in a surface of the vehicle outer side of the wheel 502. Note that configurations of the wheel 502 and the wheel recesses 504 are the same as those of the wheel 102 and the wheel recesses 120 and, thus, descriptions thereof are omitted. With the plurality of wheel recesses 504, wheel recess rows 508 are formed from the wheel recesses 504 that are adjacent in the tire radial direction.

Additionally, as illustrated in FIGS. 15 and 16, a plurality of tire recesses 503, recessed from the surface of the tire side portion S toward the inner side of the tire, is provided in the tire side portion S of the vehicle outer side. That is, the tire recesses 503 have a form that is recessed from the surface of the tire side portion S toward the vehicle inner side and, as illustrated in FIG. 15, in a plane orthogonal to the tire width direction, form a single line wherein a boundary line with other portions is closed.

The tire recesses 503 are, for example, as illustrated in FIGS. 15 and 16, disposed in a range of the tire side portion S at a predetermined pitch in the tire radial direction and the tire circumferential direction. The tire recesses 503 of this embodiment are disposed in rows in the tire radial direction and the tire circumferential direction, respectively. In the pneumatic tire 501, one tire recess row 507 is formed from a plurality of the tire recesses 503 of the plurality of tire recesses 503 disposed in a row in the tire radial direction. Additionally, with the pneumatic tire 501, because a plurality of the tire recesses 503 is disposed in rows in the tire circumferential direction, the recess rows 507 have a configuration in which they are disposed in line in the tire circumferential direction. Note that in this embodiment, the tire recesses are provided in only the tire side portion S of the vehicle outer side, but may also be provided on the vehicle inner side.

Thus, with the tire/wheel assembly 500, turbulent flow formed in the vicinity of the tire/wheel assembly 500 can be formed due to the tire recesses 503 formed in the pneumatic tire 501. The air flow that flows on the side surface of the tire/wheel assembly 500 made turbulent and, as a result, is converted to a state that flows easily along the side surface in the vicinity of the tire/wheel assembly. As a result, with the tire/wheel assembly 500, the air flow can be retained as-is in the vicinity of the side surface (buttress) of the tire/wheel assembly 500. As described above, with the tire/wheel assembly 500, air resistance can be reduced and fuel economy can be enhanced even when the tire protrusions are replaced with the tire recesses.

Additionally, with the pneumatic tire 501, by providing the tire recesses 503, the rubber volume can be reduced and heat dissipation can be enhanced due to making the air turbulent while heat generation is suppressed. Therefore, tire heat buildup and temperature increases can be suppressed.

The tire recesses and the tire protrusions are preferably formed in the same region. That is, with the tire/wheel assembly 500 of this embodiment, at least a portion of the tire recesses 503 are preferably disposed at a position separated at least 10% or more of a tire cross-sectional height from a position where a tire cross-sectional width of the pneumatic tire 501 is greatest (position of maximum cross-sectional width $L_4$) toward the outer side in the tire radial direction. That is, where $d_1$ is the tire cross-sectional height of the pneumatic tire 501, at least a portion of the tire recesses 503 are preferably formed in a region corresponding to a height $d_3$ that is farther outward in the tire radial direction than an edge of the outer side in the tire radial direction of a region corresponding to a height $d_2$ that is 10% of the tire cross-sectional height $d_1$ from the position where the tire cross-sectional width is greatest.

With the tire/wheel assembly 500, at least a portion of the tire recesses 503 are preferably disposed in a region from a rim check line to a position separated 10% of the tire cross-sectional height starting from the rim check line toward the outer side in the tire radial direction or, rather, the region corresponding to a height $d_4$ in FIG. 16. With the tire/wheel assembly 500, by disposing a portion of the tire recesses 503 in the region corresponding to the height $d_4$, heat dissipation in the pneumatic tire 501 can be further enhanced and air resistance can be reduced while suppressing heat buildup. Thereby, air resistance can be effectively reduced.

Additionally, as with the wheel recesses, the cross-sectional shape, opening diameter shape, depth form, and the like of the tire recesses can be configured to have various shapes/forms. Moreover, as with the wheel recess rows, the tire recess rows can be configured to have various forms.

With the pneumatic tire 501, a depth of the tire recesses 503 from the surface of the tire side portion S is preferably not less than 0.5 mm and not more than 5.0 mm. By configuring the depth of the tire recesses 503 to be not less than 0.5 mm, the turbulent flow generation effect can be sufficiently produced, and by configuring the depth to be not more than 5.0 mm, a thickness of the tire side portion S, particularly of the rubber at side wall portion 4 can be sufficiently ensured.

With the pneumatic tire 501 of this embodiment, a minimum distance between the bottom of the tire recesses 503 and the carcass cords is preferably not less than 0.5 mm.

In order to make the air turbulent and reduce heat buildup, the depth of the tire recesses 503 is preferably made as deep as possible, but if a bottom of the tire recesses 503 is excessively close to the carcass cords of the carcass layer 6, a thickness therebetween will decrease and a decline in durability will become a problem. Therefore, from the perspective of maintaining durability, the minimum distance between the bottom of the tire recesses 503 and the carcass cords is preferably configured to be not less than 0.5 mm. Note that from the perspective of making the air turbulent, a minimum depth of the tire recesses 503 is preferably not less than 0.3 mm.

With the pneumatic tire, a maximum diameter of the tire recesses 503 at the surface of the tire side portion S is preferably not less than 1.0 mm and not more than 8.0 mm. By configuring the maximum diameter of the tire recesses 503 at the surface of the tire side portion S to be not less than 1.0 mm and not more than 8.0 mm, a turbulent flow can be advantageously generated.

Figure 17:
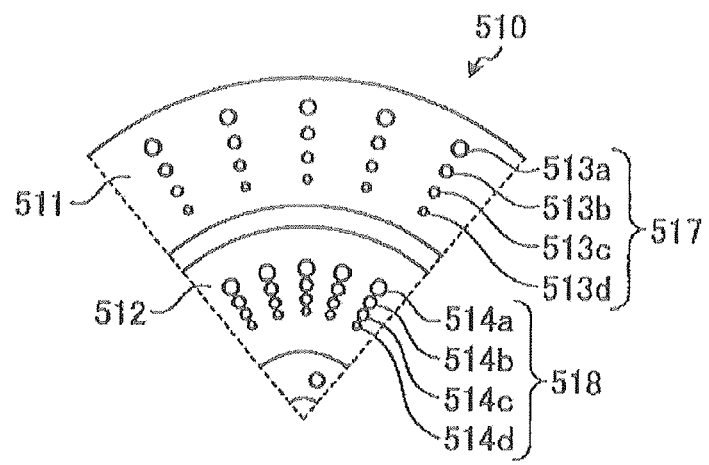
FIG. 17 is an appearance view of a tire/wheel assembly of another embodiment, seen from the vehicle outer side.
Figure 18:
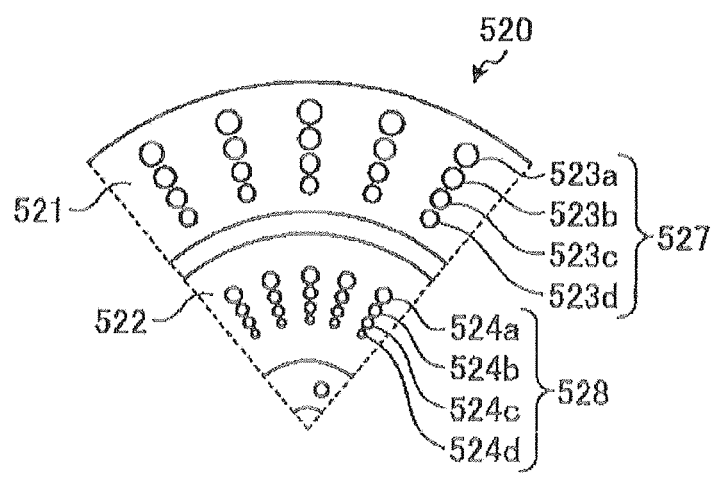
FIG. 18 is an appearance view of a tire/wheel assembly of another embodiment, seen from the vehicle outer side.

FIGS. 17 and 18 are partial appearance views of a tire/wheel assembly of other embodiments, seen from the vehicle outer side. FIGS. 17 and 18 illustrate examples of the forms of the tire protrusions and the wheel recesses when the tire/wheel assembly is seen from the vehicle outer side. With a tire/wheel assembly 510 illustrated in FIG. 17, a tire recess row 517, formed from tire recesses 513a, 513b, 513c, and 513d that are formed in a pneumatic tire 511, has a linear form extending in the tire radial direction. Additionally, a plurality of the tire recess rows 517 is disposed in the tire circumferential direction. In one of the tire recess rows 517, the tire recess 513a, the tire recess 513b having a maximum diameter at the surface of the tire side portion S that is smaller than that of the tire recess 513a, the tire recess 513c having a maximum diameter at the surface of the tire side portion S that is smaller than that of the tire recess 513b, and the tire recess 513d having a maximum diameter at the surface of the tire side portion S that is smaller than that of the tire recess 513c are disposed in the order described above from the outer side in the tire radial direction. That is, in the tire recess rows 517, the maximum diameters at the surface of the tire side portion S of the tire recesses 513a, 513b, 513c, and 513d are different sizes, and the tire recesses 513a, 513b, 513c, and 513d are disposed in a sequence where the maximum diameter decreases with progression from the outer side toward the inner side in the tire radial direction.

A wheel recess row 518, formed from wheel recesses 514a, 514b, 514c, and 514d that are formed in a wheel 512, has a linear form extending in the tire radial direction. Additionally, a plurality of the wheel recess rows 518 is disposed in the tire circumferential direction. In one of the wheel recess rows 518, the wheel recess 514a, the wheel recess 514b having a maximum diameter at the surface of the vehicle outer side that is smaller than that of the wheel recess 514a, the wheel recess 514c having a maximum diameter at the surface of the vehicle outer side that is smaller than that of the wheel recess 514b, and the wheel recess 514d having a maximum diameter at the surface of the vehicle outer side that is smaller than that of the wheel recess 514c are disposed in the order described above from the outer side in the tire radial direction. That is, in the wheel recess rows 518, the maximum diameters at the surface of the vehicle outer side of the wheel recesses 514a, 514b, 514c, and 514d are different sizes, and the wheel recesses 514a, 514b, 514c, and 514d are disposed in a sequence where the maximum diameter decreases with progression from the outer side toward the inner side in the tire radial direction. Thus, with the tire/wheel assembly, the tire recesses and wheel recesses are disposed in the sequence where the maximum diameter decreases with progression from the outer side toward the inner side in the tire radial direction and, therefore aerodynamic performance can be enhanced. Specifically, by configuring the maximum diameters of the tire recesses and the wheel recesses larger on the outer side in the radial direction where the rotation speed is relatively faster and the area is greater, turbulent flow can be more advantageously generated and aerodynamic performance can be enhanced.

With a tire/wheel assembly 520 illustrated in FIG. 18, a tire recess row 527, formed from tire recesses 523a, 523b, 523c, and 523d that are formed in a pneumatic tire 521, has a linear form extending in the tire radial direction. That is, in one of the tire recess rows 527, the maximum diameters at the surface of the tire side portion S of the tire recesses 523a, 523b, 523c, and 523d are different sizes, and the tire recesses 523a, 523b, 523c, and 523d are disposed in a sequence where the maximum diameter decreases with progression from the outer side toward the inner side in the tire radial direction.

A wheel recess row 528, formed from wheel recesses 524a, 524b, 524c, and 524d that are formed in a wheel 522, has a linear form extending in the tire radial direction. Additionally, a plurality of the wheel recess rows 528 is disposed in the tire circumferential direction. In one of the wheel recess rows 528, the maximum diameters at the surface of the vehicle outer side of the wheel recesses 524a, 524b, 524c, and 524d are different sizes, and the wheel recesses 524a, 524b, 524c, and 524d are disposed in a sequence where the maximum diameter decreases with progression from the outer side toward the inner side in the tire radial direction.

With the tire/wheel assembly 520, even when comparing the tire recess rows 527 and the wheel recess rows 528, the tire recess rows 527 and the wheel recess rows 528 are disposed in an order where the maximum diameter of the wheel recesses and the tire recesses decreases with progression from the outer side toward the inner side in the tire radial direction. That is, the maximum diameter at the surface of the vehicle outer side of the wheel recess 524a that is disposed outermost in the tire radial direction in the wheel recess row 528 is smaller than the maximum diameter at the surface of the tire side portion S of the tire recess 523d that is disposed innermost in the tire radial direction in the tire recess row 527. Thus, with the tire/wheel assembly, even between the tire recesses and the wheel recesses, the tire recesses and wheel recesses are disposed in the sequence where the maximum diameter decreases with progression from the outer side toward the inner side in the tire radial direction and, therefore aerodynamic performance can be enhanced. Specifically, by configuring the maximum diameters of the tire recesses and the wheel recesses larger on the outer side in the radial direction where the rotation speed is relatively faster and the area is greater, turbulent flow can be more advantageously generated and aerodynamic performance can be enhanced.

Note that in FIGS. 17 and 18, with each of the recess rows, the area of the openings of the tire recesses at the surface of the tire side portion and the area of the openings of the wheel recesses at the surface of the vehicle outer side were configured to decrease with progression from the outer side toward the inner side in the tire radial direction, but the configuration is not limited thereto and the depth of the tire recesses from the surface of the side wall portion and the depth of the wheel recesses from the surface of the vehicle outer side may be varied according to their positions in the tire radial direction. Specifically, the depth of the tire recesses from the surface of the tire side portion and the depth of the wheel recesses from the surface of the vehicle outer side may have a form that becomes shallower with progression from the vehicle outer side toward the vehicle inner side.

As described above, with the tire/wheel assembly, the aerodynamic performance and the heat dissipation performance can be made more suitable, and the performances of the tire/wheel assembly can be enhanced by varying the wheel recess rows according to a rule in which the area of the opening of the wheel recesses at the surface of the vehicle outer side decreases with progression from the outer side in the tire radial direction toward the inner side in the tire radial direction and/or a rule in which the depth of the wheel recesses from the surface of the vehicle outer side decreases with progression from the outer side in the tire radial direction toward the inner side in the tire radial direction. Additionally, with the tire/wheel assembly, the aerodynamic performance and the heat dissipation performance can be made more suitable, and the performances of the tire/wheel assembly can be enhanced by varying the tire recess rows according to a rule in which the area of the opening of the tire recesses at the surface of the vehicle outer side decreases with progression from the outer side in the tire radial direction toward the inner side in the tire radial direction and/or a rule in which the depth of the tire recesses from the surface of the vehicle outer side decreases with progression from the outer side in the tire radial direction toward the inner side in the tire radial direction. With the tire/wheel assembly, the wheel recess rows and the tire recess rows are both preferably formed according to the rules described above and, as illustrated in FIG. 18, preferably the rules described above are satisfied between the wheel recess rows and the tire recess rows, that is, preferably the area of the openings is smaller or the depth is shallower for the wheel recesses than for the tire recesses. As a result, the aerodynamic performance and the heat dissipation performance can be made more suitable, and the performances of the tire/wheel assembly can be enhanced.

Additionally, with the tire/wheel assembly, both the tire recesses and the tire protrusions may be formed in the tire side portion. For example, the tire recesses may be formed in a first tire side portion of the pneumatic tire and the tire protrusions may be formed on a second tire side portion. Alternatively, both the tire protrusions and the tire recesses may be formed in a single tire side portion.

With the tire/wheel assembly, in cases where both the tire recesses and the tire protrusions are formed of the tire side portion, at least a portion of the tire protrusions are preferably disposed at a position separated at least 10% or more of the tire cross-sectional height from the position where the tire cross-sectional width of the pneumatic tire is greatest toward the outer side in the tire radial direction; and at least a portion of the tire recesses are preferably disposed in a region from a rim check line to a position separated 10% of the tire cross-sectional height starting from the rim check line toward the outer side in the tire radial direction. As a result, turbulent flow can be appropriately generated by the tire protrusions in a region on the outer side in the tire radial direction where rotation speed when traveling is relatively fast in the tire side portion and that is prone to receiving air resistance. Additionally, heat dissipation effects can be maintained at a high level while turbulent flow is appropriately generated by the tire recesses in a region on the inner side in the tire radial direction where rotation speed when traveling is relatively slow in the tire side portion. Thus, the overall air resistance of the tire/wheel assembly can be more effectively reduced.

A form of the portion of the wheel of the tire/wheel assembly that is exposed to the vehicle outer side is not limited to the embodiment described above and can be configured to have various forms. Moreover, the exposed portion may be a curved surface of a flat surface. As described above, aerodynamic performance can be further enhanced by configuring the portion exposed to the vehicle outer side to be a single surface such as the wheel disk 114.

In the embodiment described above, the wheel includes a wheel disk, but the configuration of the wheel is not limited thereto. The tire/wheel assembly may have a configuration in which a wheel disk is not provided, that is, a configuration in which the spokes are exposed to the vehicle outer side.

Figure 19:
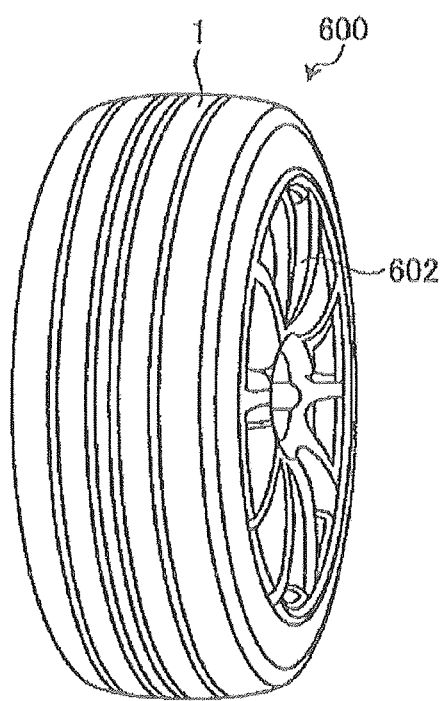
FIG. 19 is a perspective view illustrating a tire/wheel assembly according to another embodiment.
Figure 20:
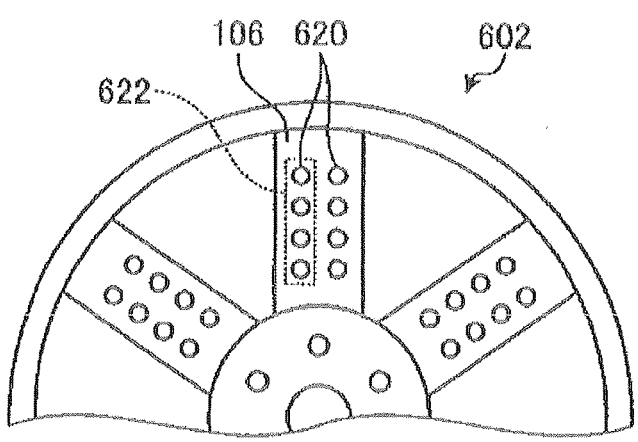
FIG. 20 is a meridian cross-sectional view of the tire/wheel assembly depicted in FIG. 19.

Another embodiment of the tire/wheel assembly will be described using FIGS. 19 and 20. FIG. 19 is a perspective view illustrating a tire/wheel assembly according to another embodiment. FIG. 20 is a meridian cross-sectional view of the tire/wheel assembly depicted in FIG. 19. A tire/wheel assembly 600 illustrated in FIGS. 19 and 20 includes a pneumatic tire 1 and a wheel 602. The pneumatic tire 1 has the same configuration as the pneumatic tire 1 of the tire/wheel assembly 100 and, thus, description thereof is omitted.

As illustrated in FIG. 20, with the wheel 602, a plurality of wheel recesses 620, which are recessed from a surface of a spoke 106 toward the vehicle inner side (inner side of the wheel 602), is provided in the surface of the vehicle outer side of the spoke 106. In FIG. 20, the "surface of the spoke 106" is a uniformly continuing surface that is exposed to the vehicle outer side. That is, the wheel recesses 620 have a form that is recessed from the surface of the spoke 106 toward the vehicle inner side and, as illustrated in FIG. 20, in a plane orthogonal to the tire width direction, form a single line wherein a boundary line with other portions is closed.

The wheel recesses 620 are disposed at a predetermined pitch in the tire radial direction and the tire circumferential direction in the surface of the spoke 106 and, more specifically, are disposed in rows. In the wheel 602, one recess row 622 (wheel recess row) is formed from a plurality of the wheel recesses 620 disposed in a row in the tire radial direction of the plurality of wheel recesses 620. Additionally, with the wheel 602, because a plurality of the wheel recesses 620 is disposed in rows in the tire circumferential direction, the recess rows 622 have a configuration in which they are disposed in line in the tire circumferential direction.

With the tire/wheel assembly 600, even though the configuration does not include a wheel disk, the same effects as those of the tire/wheel assembly 100 described above can be obtained by forming the wheel recesses 620 in the surface of the spoke 106 that is exposed to the vehicle outer side of the wheel 602.

The tire/wheel assembly 600 of this embodiment has a structure in which the rim portion and the hub of the wheel 602 are joined by a plurality of the spokes 106, but the wheel 602 is not limited to such a structure. For example, the tire/wheel assembly 600 may have a structure where, in place of the plurality of spokes 106, a single disk is attached to an inner circumference portion of the rim portion and this disk is attached to an axle. With this structure, the disk exerts the functionality of the spokes 106 and the hub. Additionally, with the tire/wheel assembly 600, even when the wheel disk is not provided, as described above, a certain region of the outer side in the tire radial direction is preferably configured to have a form that is free of cavities. Thereby, air resistance can be further reduced.

Additionally, even when the wheel disk is not provided, as in this embodiment, a form of the edge surface of the vehicle outer side of the wheel (e.g. the edge surface of the vehicle outer side of the spoke) is configured to expand gradually toward the vehicle outer side with progression toward the inner side in the radial direction and, therefore, the air flow can flow more smoothly from the pneumatic tire to the wheel and air resistance can be further reduced.

With the embodiment described above, the wheel recesses are provided in the surface of the vehicle outer side of the wheel, but protrusions with a form protruding from the surface may also be provided in addition to the wheel recesses in the surface of the vehicle outer side of the wheel.

The tire/wheel assembly described above can be used as a passenger car tire/wheel assembly and also as a heavy duty or run-flat tire/wheel assembly. When used as a passenger car pneumatic tire, the effects described above can be obtained. Additionally, when used as a heavy duty tire/wheel assembly, particularly under heavy loads, deformations of the tire when the tire side portion is compressed can be further suppressed by the recesses and the protrusions of the pneumatic tire. Therefore, durability is enhanced. Additionally, when used as a run flat tire/wheel assembly, particularly when punctured, deformations of the tire when the tire side portion is compressed can be further suppressed by the recesses and the protrusions of the pneumatic tire. Therefore, durability is enhanced.

EXAMPLES

In the examples, performance testing for a fuel economy improvement rate was performed on a plurality of types of tire/wheel assemblies under different conditions.

In this performance testing, a pneumatic tire have a tire size of 185/65R15 was assembled on a regular rim and inflated to a regular inner pressure. Then the pneumatic tire was mounted on a compact front-wheel drive vehicle having an engine displacement of 1,500 cc.

Figure 21:
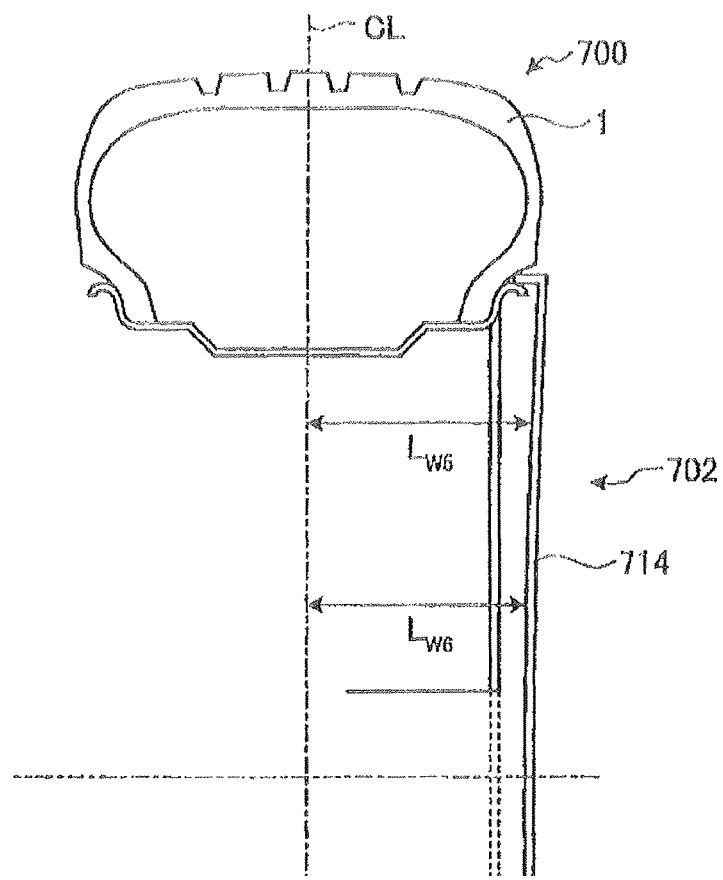
FIG. 21 is a meridian cross-sectional view of a tire/wheel assembly according to another embodiment.

In the examples, performance testing was conducted for tire/wheel assemblies of Comparative Examples 1 to 3 and Working Examples 1 to 4. FIG. 21 is an appearance view of a tire/wheel assembly of another embodiment, seen from the vehicle outer side. The tire/wheel assembly of Comparative Example 1 had a configuration in which neither protrusions of the pneumatic tire nor recesses of the wheel were provided. The tire/wheel assembly of Comparative Example 2 had a configuration in which the tire protrusions were provided in the pneumatic tire but the wheel recesses were not provided in the wheel. The tire/wheel assembly of Comparative Example 3 had a configuration in which the tire protrusions were not provided on the pneumatic tire but the wheel recesses were provided in the wheel.

The tire/wheel assembly of Working Example 1 had a configuration in which the tire protrusions were provided on the pneumatic tire and the wheel recesses were provided in the wheel. Specifically, the tire/wheel assembly of Working Example 1 was the tire/wheel assembly 100 illustrated in FIG. 4. With the tire/wheel assembly 100, the wheel recesses 120 were only provided in the region in the tire circumferential direction where the tire protrusions 9 were provided.

The tire/wheel assembly of Working Example 2 had a configuration in which the tire protrusions were provided on the pneumatic tire and the wheel recesses were provided in the wheel. Specifically, with the tire/wheel assembly of Working Example 2, the disposal of the recesses was the same as that for the tire/wheel assembly 480 illustrated in FIG. 13, that is, the wheel recesses were provided throughout the entire tire circumferential direction. With the tire/wheel assembly of Working Example 2, a cavity was formed in the wheel. That is, a space connecting the surface of the vehicle outer side of the wheel and the vehicle inner side was formed.

The tire/wheel assembly of Working Example 3 had the same configuration as that of Working Example 2, with the exception that the form of the wheel was that illustrated in FIG. 21. A tire/wheel assembly 700 illustrated in FIG. 21 includes a pneumatic tire 1 and a wheel 702. A wheel disk 714 is disposed on the surface of the vehicle outer side of the wheel 702. The wheel disk 714 has a form in which a distance from the tire equatorial plane CL to the edge surface of the vehicle outer side decreased with progression from the outer side toward the inner side in the tire radial direction. That is, with the wheel 702, where $L_{W5}$ is a distance from the tire equatorial plane CL at a first position on the outer side in the tire radial direction to the edge surface of the vehicle outer side, and $L_{W6}$ is a distance from the tire equatorial plane CL at a second position that is inward in the tire radial direction of the first position to the edge surface of the vehicle outer side, $L_{W6} < L_{W5}$.

The tire/wheel assembly of Working Example 4 had the same configuration as that of Working Example 2, with the exception that the form of the wheel was that illustrated in FIG. 14. With the tire/wheel assembly of Working Example 4, the wheel disk had a form in which a distance from the tire equatorial plane CL to the edge surface of the vehicle outer side increased with progression from the outer side toward the inner side in the tire radial direction.

Method of evaluating the fuel economy improvement rate: Fuel economy was measured for a case where the test vehicle described above was driven 50 laps on a 2 km (total length) test course at a speed of 100 km/h. Then, based on these measurement results, the fuel economy improvement rate was indexed with an index score (100) of the tire/wheel assembly of Comparative Example 1 being a reference. In this evaluation, larger index scores indicate enhanced fuel economy improvement rates. The measurement results are shown in Tables 1 and 2.

TABLE 1

|  | Comparative Example 1 | Comparative Example 2 | Comparative Exampje 3 | Working Example 1 |
|---|---|---|---|---|
| Presence/absence of tire protrusions | None | Present | None | Present |
| Presence/absence of wheel recesses | None | None | Present | Present |
| Fuel economy | 100 | 101 | 100.5 | 103.5 |

TABLE 2

|  | Working Example 1 | Working Example 2 | Working Example 3 | Working Example 4 |
|---|---|---|---|---|
| Presence/absence of tire protrusions | Present | Present | Present | Present |
| Presence/absence of wheel recesses | Present | Present | Present | Present |
| Relative positional relationship of recesses and protrusions | FIG. 4 | FIG. 13 | FIG. 13 | FIG. 13 |
| Form of wheel | Includes cavity | Includes cavity | FIG. 21 | FIG. 14 |
| Fuel economy | 103.5 | 104.5 | 104.7 | 104.8 |

It is clear from Tables 1 and 2 that, with a tire/wheel assembly, fuel economy could be enhanced by providing the tire protrusions on the pneumatic tire and the wheel recesses in the wheel compared with cases where either the tire protrusions of the pneumatic tire or the wheel recesses of the wheel were provided, and cases where neither the tire protrusions of the pneumatic tire nor the wheel recesses of the wheel were provided. Additionally, as shown by Working Example 4, it is clear that fuel economy can be further enhanced by configuring the wheel to have a form in which the distance from the tire equatorial plane CL to the edge surface of the vehicle outer side increases with progression from the outer side toward the inner side in the tire radial direction.

What is claimed is:

1. A tire/wheel assembly comprising:
a wheel including an attaching portion for attaching the wheel to a vehicle, and
a pneumatic tire that is fit on a periphery of the wheel; wherein
the pneumatic tire comprises a plurality of tire protrusions and/or a plurality of tire recesses on a tire side portion that constitutes a vehicle outer side;
the wheel comprises a plurality of wheel recesses in a surface that constitutes the vehicle outer side;
the tire protrusions are disposed in a first angular range in a tire circumferential direction; and
the wheel recesses are disposed at least in an entirety of a second angular range in the tire circumferential direction where the tire protrusions are not formed.

2. The tire/wheel assembly according to claim 1, wherein the wheel comprises:
the attaching portion for attaching the wheel to the vehicle; and
a wheel disk, wherein a surface of the wheel disk that is fixed to the attaching portion and is exposed to a surface of the vehicle outer side is disk-shaped, and forms a surface constituting the vehicle outer side; and
the wheel recesses are formed in the wheel disk.

3. The tire/wheel assembly according to claim 1, wherein:
where D is a distance from an outer side edge in a tire radial direction of a rim portion, to which the pneumatic tire is fixed, to a tire rotational axis;
the wheel does not comprise a cavity communicating with an edge surface of a vehicle inner side in a range from a position 0.4D outward in the tire radial direction from a center in the tire radial direction of the wheel to the outer side edge in the tire radial direction.

4. The tire/wheel assembly according to claim 1, wherein in the wheel, a distance in a tire width direction from a center in a width direction of the tire to an edge surface of the vehicle outer side increases with progression from an outer side of the wheel in the tire radial direction toward an inner side of the wheel in the tire radial direction.

5. The tire/wheel assembly according to claim 1, wherein:
the wheel recesses constitute a plurality of wheel recess rows formed in the tire radial direction, and
the wheel recess rows are disposed at a pitch in the tire circumferential direction.

6. The tire/wheel assembly according to claim 5, wherein the wheel recess rows are disposed at a position where a center line of the wheel recess rows overlaps with an extended line of a center line of the tire protrusions extended outward in the radial direction.

7. The tire/wheel assembly according to claim 5, wherein the wheel recess rows vary according to:
a rule in which an area of an opening of the wheel recesses at the surface of the vehicle outer side decreases with progression from an outer side in the tire radial direction toward an inner side in the tire radial direction; and/or
a rule in which a depth of the wheel recesses from the surface of the vehicle outer side decreases with progression from the outer side in the tire radial direction toward the inner side in the tire radial direction.

8. The tire/wheel assembly according to claim 1, wherein:
the tire recesses constitute a plurality of tire recess rows formed in rows in the tire radial direction, and
the tire recess rows are disposed at a pitch in the tire circumferential direction.

9. The tire/wheel assembly according to claim 8, wherein the tire recess rows vary according to:
a rule in which an area of an opening of the tire recesses at the surface of the vehicle outer side decreases with progression from an outer side in the tire radial direction toward an inner side in the tire radial direction; and/or
a rule in which a depth of the tire recesses from the surface of the vehicle outer side decreases with progression from the outer side in the tire radial direction toward the inner side in the tire radial direction.

10. The tire/wheel assembly according to claim 1, wherein at least a portion of the tire protrusions and the tire recesses are disposed at a position separated at least 10% or more of a tire cross-sectional height from a position where a tire cross-sectional width of the pneumatic tire is greatest toward an outer side in the tire radial direction.

11. The tire/wheel assembly according to claim 1, wherein:
at least a portion of the tire protrusions are disposed at a position separated at least 10% or more of the tire cross-sectional height from a position where the tire cross-sectional width of the pneumatic tire is greatest toward an outer side in the tire radial direction; and
at least a portion of the tire recesses are disposed in a region from a rim check line to a position separated 10% of the tire cross-sectional height starting from the rim check line toward the outer side in the tire radial direction.

12. The tire/wheel assembly according to claim 1, wherein:
where $D_1$ is a distance in the tire radial direction from an outer side edge in the tire radial direction of the rim portion, to which the pneumatic tire is fixed, to the tire rotational axis;
at least a portion of the wheel recesses are disposed in a region from the outer side edge in the tire radial direction of the rim portion to a position displaced $0.1D_1$ inward in the tire radial direction starting from the outer side edge in the tire radial direction of the rim portion.

13. The tire/wheel assembly according to claim 1, wherein:
where $L_1$ is a distance in the tire width direction from a tire equatorial plane of the pneumatic tire to an edge of the vehicle outer side of the pneumatic tire; and
$L_2$ is a distance in the tire width direction from the tire equatorial plane of the pneumatic tire to the edge of the vehicle outer side of the wheel;
the distance $L_1$ and the distance $L_2$ have a relationship such that $L_2 \leq 1.2 \times L_1$ is satisfied.

14. The tire/wheel assembly according to claim 1, wherein the wheel recesses are configured so that a depth of the wheel recesses from the surface of the vehicle outer side is not less than 0.5 mm and not more than 5.0 mm.

15. The tire/wheel assembly according to claim 1, wherein the wheel recesses are configured so that a maximum diameter of the wheel recesses in the surface of the vehicle outer side is not less than 1.0 mm and not more than 8.0 mm.

16. The tire/wheel assembly according to claim 1, wherein a depth of the tire recesses from the surface of the tire side portion is not less than 0.5 mm and not more than 5.0 mm.

17. The tire/wheel assembly according to claim 1, where a maximum diameter of the tire recesses in the surface of the tire side portion is not less than 1.0 mm and not more than 8.0 mm.

18. The tire/wheel assembly according to claim 1, wherein a height of the tire protrusions is not less than 0.5 mm and not more than 10 mm.

19. The tire/wheel assembly according to claim 1, wherein the tire protrusions are formed with a longitudinal shape in the tire radial direction and are disposed at a pitch in the tire circumferential direction.

* * * * *